(12) United States Patent
Shetty

(10) Patent No.: US 11,573,846 B2
(45) Date of Patent: *Feb. 7, 2023

(54) FAILURE MODE SPECIFIC ANALYTICS USING PARAMETRIC MODELS

(71) Applicant: SAP SE, Walldorf (DE)

(72) Inventor: Rashmi B. Shetty, Fremont, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,405

(22) Filed: Jun. 20, 2022

(65) Prior Publication Data
US 2022/0391276 A1 Dec. 8, 2022

Related U.S. Application Data

(63) Continuation of application No. 17/235,686, filed on Apr. 20, 2021, now Pat. No. 11,385,950, which is a
(Continued)

(51) Int. Cl.
G06F 11/07 (2006.01)
G06N 20/00 (2019.01)

(52) U.S. Cl.
CPC ........ *G06F 11/0751* (2013.01); *G06F 11/079* (2013.01); *G06F 11/0775* (2013.01); *G06N 20/00* (2019.01)

(58) Field of Classification Search
CPC ............. G06F 11/0751; G06F 11/0775; G06F 11/079; G06N 20/00
See application file for complete search history.

(56) References Cited

U.S. PATENT DOCUMENTS 9,152,488 B2   10/2015 Presman et al.
9,652,160 B1   5/2017  Piszczek et al.
(Continued)

FOREIGN PATENT DOCUMENTS

JP    S60205755 A    * 10/1985
WO    WO-2020178811 A1 * 9/2020 .......... G06F 11/0739

OTHER PUBLICATIONS

Michael G. Pecht; Myeongsu Kang, "Predictive Maintenance in the IoT Era," in Prognostics and Health Management of Electronics: Fundamentals, Machine Learning, and the Internet of Things , IEEE, 2019, pp. 589-612. (Year: 2019).*
(Continued)

*Primary Examiner* — Matthew M Kim
*Assistant Examiner* — Indranil Chowdhury
(74) *Attorney, Agent, or Firm* — Schwegman Lundberg & Woessner, P.A.

(57) ABSTRACT

Techniques for predicting failure mode specific reliability characteristics of tangible equipment using parametric probability models are disclosed. In some example embodiments, a computer system receives a model training configuration entered via a user interface, trains a failure curve model for a selected failure mode of a selected equipment model based on the model training configuration at a time indicated by training schedule data, and generates analytical data for the selected failure mode of the selected equipment model using the trained failure curve model. The failure mode corresponds to a specific way in which the equipment model is capable of failing. In some example embodiments, the training of the failure curve model comprises determining a shape parameter and a scale parameter for the failure curve model based on a fitting of failure event data to a continuous probability distribution, and storing the parameters for use in generating the analytical data.

20 Claims, 19 Drawing Sheets

Related U.S. Application Data continuation of application No. 16/694,673, filed on Nov. 25, 2019, now Pat. No. 11,010,222.

(60) Provisional application No. 62/893,720, filed on Aug. 29, 2019.

(56) References Cited

U.S. PATENT DOCUMENTS

| | | | |
|---|---|---|---|
| 10,048,996 B1 * | 8/2018 | Bell | G06F 11/3006 |
| 10,261,850 B2 | 4/2019 | Nicholas et al. | |
| 10,353,764 B1 | 7/2019 | Cazzanti et al. | |
| 10,901,832 B2 | 1/2021 | Farahat et al. | |
| 11,010,222 B2 | 5/2021 | Shetty | |
| 11,119,660 B2 | 9/2021 | Borlick et al. | |
| 2004/0181712 A1 | 9/2004 | Taniguchi et al. | |
| 2006/0259271 A1 | 11/2006 | House et al. | |
| 2008/0059120 A1 | 3/2008 | Xiao et al. | |
| 2008/0126040 A1 * | 5/2008 | Franklin | G06F 11/261 |
| | | | 703/7 |
| 2008/0250265 A1 | 10/2008 | Chang et al. | |
| 2012/0283963 A1 | 11/2012 | Mitchell et al. | |
| 2013/0262064 A1 * | 10/2013 | Mazzaro | G05B 23/0283 |
| | | | 703/7 |
| 2014/0129000 A1 * | 5/2014 | Block | G06F 11/008 |
| | | | 700/79 |
| 2014/0380106 A1 | 12/2014 | Presman et al. | |
| 2015/0066431 A1 | 3/2015 | Zheng et al. | |
| 2016/0097699 A1 | 4/2016 | Leao | |
| 2016/0153806 A1 | 6/2016 | Ciasulli et al. | |
| 2016/0240017 A1 | 8/2016 | Lacaille et al. | |
| 2016/0292652 A1 * | 10/2016 | Bowden, Jr. | G06Q 10/20 |
| 2016/0349723 A1 | 12/2016 | Patel et al. | |
| 2016/0357895 A1 * | 12/2016 | Hyde | G06F 30/20 |
| 2016/0371599 A1 | 12/2016 | Nicholas et al. | |
| 2017/0161130 A1 | 6/2017 | Goldstein et al. | |
| 2017/0235620 A1 | 8/2017 | Barclay et al. | |
| 2017/0242081 A1 | 8/2017 | Kemp, Jr. | |
| 2018/0005151 A1 | 1/2018 | Liao et al. | |
| 2018/0173599 A1 | 6/2018 | Kalech et al. | |
| 2019/0042675 A1 | 2/2019 | Martin et al. | |
| 2019/0050515 A1 | 2/2019 | Su et al. | |
| 2020/0004435 A1 | 1/2020 | Borlick et al. | |
| 2020/0051419 A1 | 2/2020 | Malaver et al. | |
| 2020/0057689 A1 | 2/2020 | Farahat et al. | |
| 2020/0192737 A1 | 6/2020 | Kind et al. | |
| 2020/0210538 A1 | 7/2020 | Wang et al. | |
| 2020/0265331 A1 * | 8/2020 | Tashman | G06N 20/00 |
| 2021/0064456 A1 | 3/2021 | Shetty | |
| 2021/0065086 A1 | 3/2021 | Lee et al. | |
| 2021/0182133 A1 | 6/2021 | Donegan et al. | |
| 2021/0216065 A1 | 7/2021 | Spiro et al. | |
| 2021/0240559 A1 | 8/2021 | Shetty | |
| 2021/0382631 A1 | 12/2021 | Singh et al. | |
| 2022/0026895 A1 | 1/2022 | Leitch et al. | |
| 2022/0091923 A1 * | 3/2022 | O'Toole | G06N 20/20 |
| 2022/0317676 A1 * | 10/2022 | Reaume | G06Q 10/20 |

OTHER PUBLICATIONS

"U.S. Appl. No. 16/694,673, 312 Amendment filed Apr. 9, 2021", 3 pgs.

"U.S. Appl. No. 16/694,673, Notice of Allowance dated Jan. 11, 2021", 13 pgs.

"U.S. Appl. No. 17/235,686, Non Final Office Action dated Oct. 28, 2021", 22 pgs.

"U.S. Appl. No. 17/235,686, Notice of Allowance dated Mar. 8, 2022", 20 pgs.

"U.S. Appl. No. 17/235,686, Preliminary Amendment filed May 19, 2021", 3 pages.

"U.S. Appl. No. 17/235,686, Response filed Jan. 28, 2022 to Non Final Office Action dated Oct. 28, 2021", 14 pgs.

* cited by examiner

FAILURE MODE SPECIFIC ANALYTICS USING PARAMETRIC MODELS

CROSS-REFERENCE TO RELATED APPLICATIONS

This application is a continuation of prior application Ser. No. 17/235,686, filed on Apr. 20, 2021, which is a continuation of U.S. application Ser. No. 16/694,673, filed on Nov. 25, 2019, and entitled, "FAILURE MODE SPECIFIC ANALYTICS USING PARAMETRIC MODELS," which claims priority to U.S. Provisional Application No. 62/893,720, filed on Aug. 29, 2019, and entitled, "FAILURE MODE SPECIFIC ANALYTICS USING PARAMETRIC MODELS," which applications are hereby incorporated by reference in their entirety as set forth herein.

TECHNICAL FIELD

The present application relates generally to the technical field of electrical computer systems, and, in various embodiments, to systems and methods of predicting failure mode specific reliability characteristics of tangible equipment assets using parametric probability models.

BACKGROUND

Current solutions for predicting failures in equipment are dependent on sensor data. However, a significant amount of equipment is not instrumented with sensors for providing such data. Data such as mean time between failures (MTBF) metrics are not actionable measures of equipment life span or remaining useful life. As a result, computer systems lack the ability to accurately estimate important analytical data used in maintaining the equipment, such as the probability of failure and the remaining useful life for a particular equipment model. Furthermore, current solutions do not provide user interface with interactive visualizations of such analytical data or the ability for users to interactively adjust the granularity of such analytical data to focus the analytical data on a particular mode of failure of a particular equipment model rather than just a general failure of the particular equipment model.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems for predicting failure mode specific reliability characteristics of tangible equipment assets using parametric probability models are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to generate accurate and granular analytical data for an equipment model that is not instrumented with sensors. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
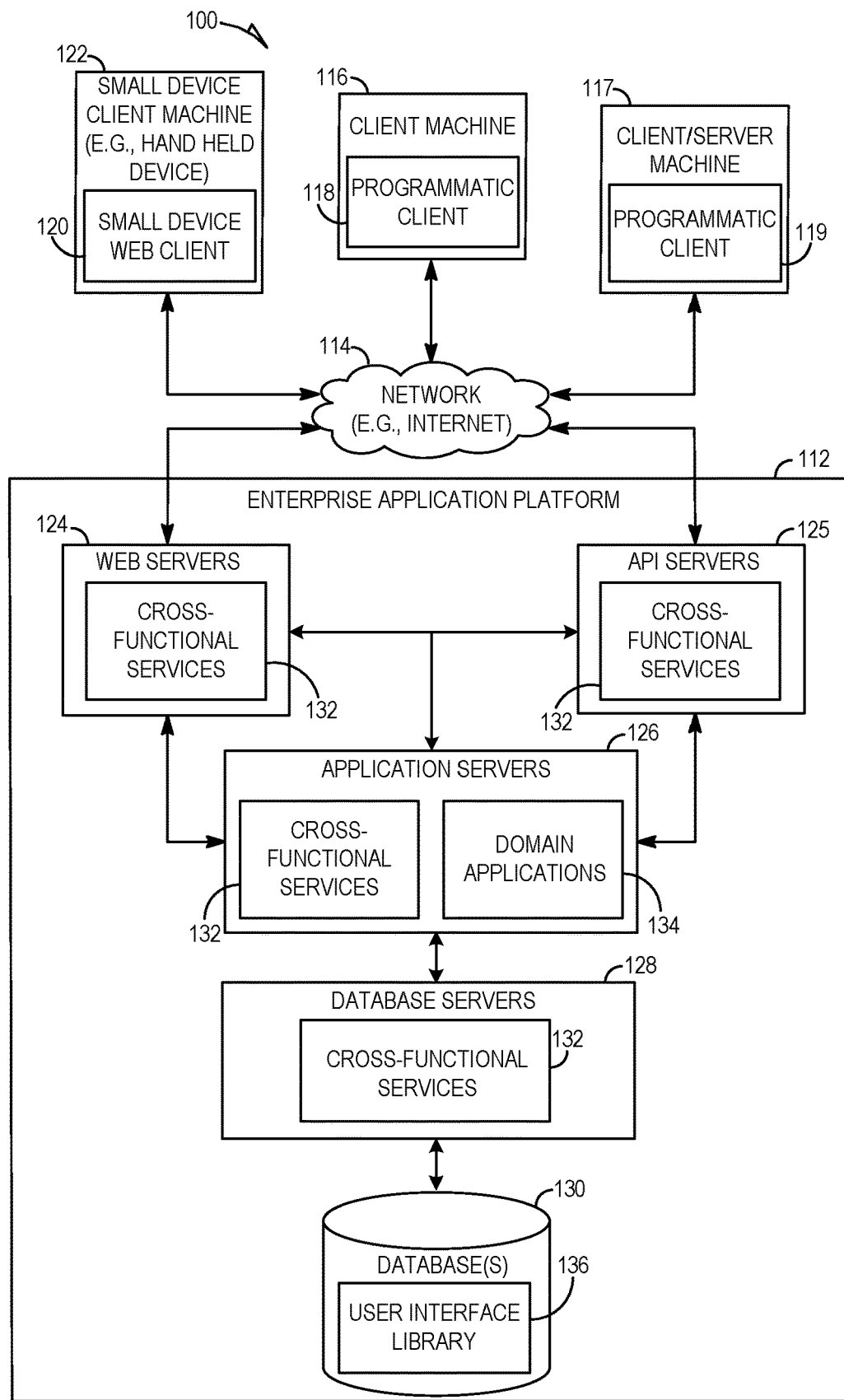
FIG. 1 is a network diagram illustrating a client-server system, in accordance with some example embodiments.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are, of course, not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-8.

Figure 2:
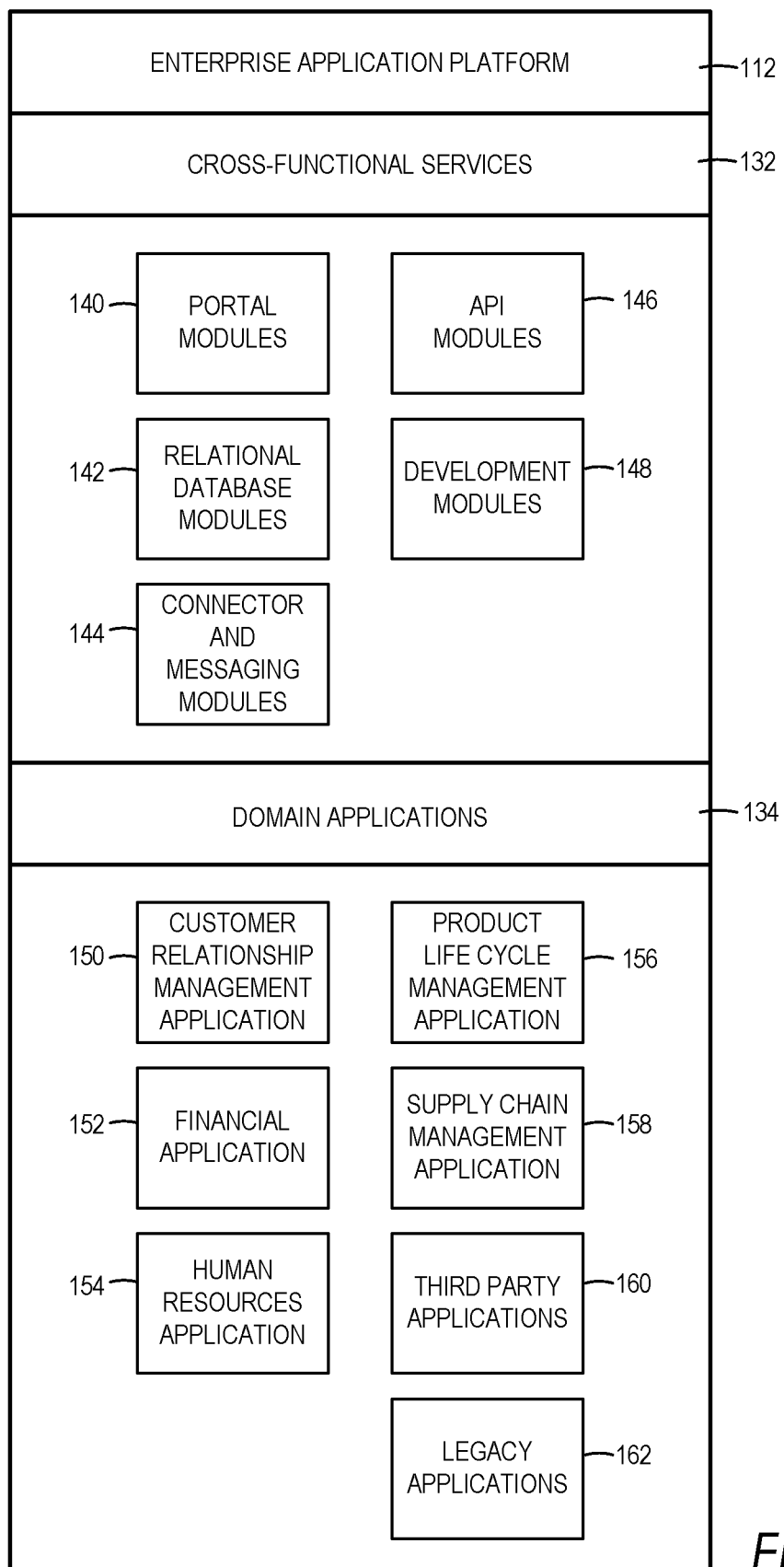
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
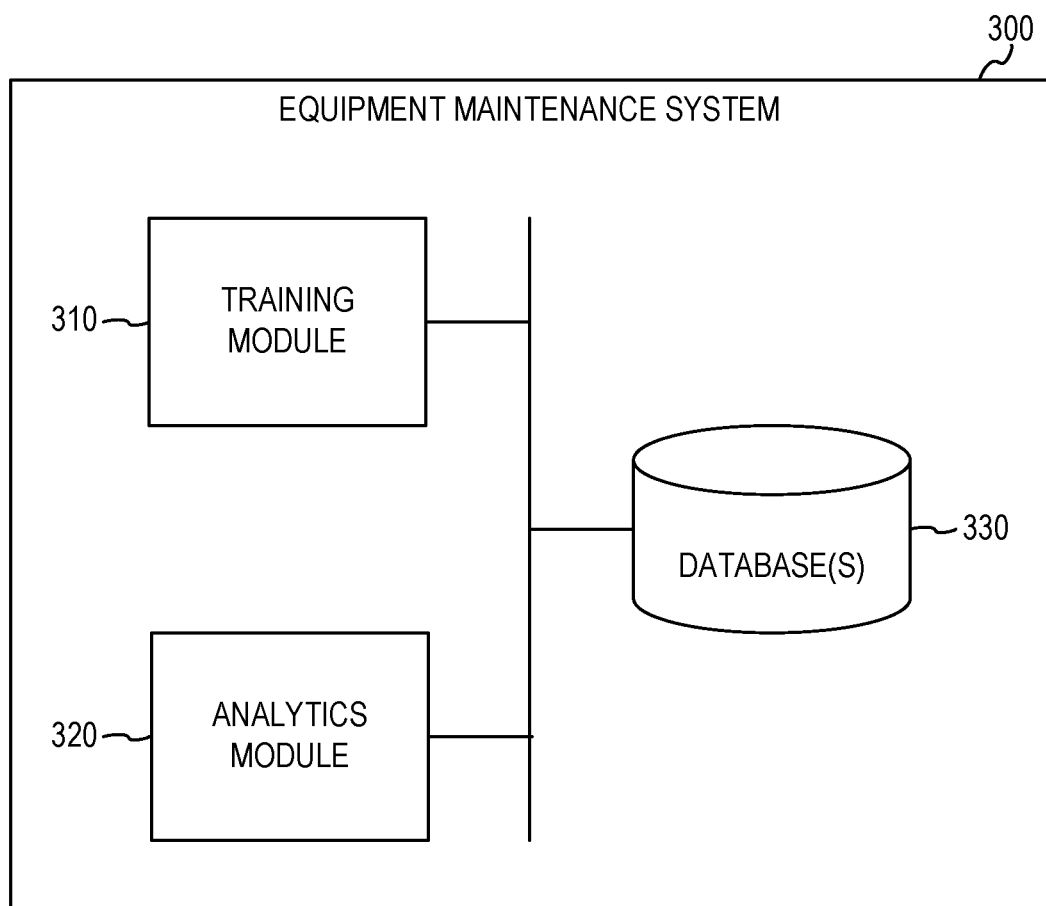
FIG. 3 is a block diagram illustrating an equipment maintenance system, in accordance with some example embodiments.

FIG. 3 is a block diagram illustrating an equipment maintenance system 300, in accordance with some example embodiments. In some example embodiments, the equipment maintenance system 300 is configured to automate the collection of maintenance data relating to failure events of an equipment model, and then apply statistical methods of fitting the data to a probability distribution such to determine a failure curve. Based on the failure curve and a life or age indicator of the equipment, the equipment management system 300 can accurately estimate the probability of failure or remaining useful life of the equipment model, as well as other analytics.

In some embodiments, the equipment maintenance system 300 comprises any combination of one or more of a training module 310, an analytics module 320, and one or more database(s) 330. The modules 310 and 320 and the database(s) 330 can reside on a computer system, or other machine, having a memory and at least one processor (not shown). In some embodiments, the modules 310 and 320 is incorporated into the application server(s) 126 in FIG. 1 and the database(s) 330 is incorporated into the database(s) 130 in FIG. 1. However, it is contemplated that other configurations of the modules 310 and 320 and the database(s) 330 are also within the scope of the present disclosure.

In some example embodiments, one or more of the modules 310 and 320 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310 and 320 are configured to receive user input. For example, one or more of the modules 310 and 320 can present one or more GUI elements (e.g., drop-down menu, selectable buttons, text field) with which a user can submit input. In some example embodiments, one or more of the modules 310 and 320 is configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the training module 310 is configured to obtain failure data for an equipment model. The term "equipment model" is used herein to refer to any type of machine that is capable of performing a function and has a unique identification and design that is different from other machines, which may be indicated by a product identification or model number of the equipment model. An equipment model is also referred to herein as an "asset." The failure data may be stored in and retrieved from the database(s) 330. In some example embodiments, the database(s) 330 stores corresponding failure data for each one of a plurality of equipment models. For example, the database(s) 330 may store corresponding failure data for each one of a plurality of different models of hydraulic pumps, as well as corresponding failure data for each of a plurality of different models of other types or categories of equipment as well. In some example embodiments, the failure data comprises data identifying, for a specific equipment model, the occurrence of events in which the specific equipment model suffered a functional failure, including data indicating the specific type of failure (e.g., the nature of the failure and the specific subcomponent of the equipment model that suffered the failure) and corresponding time data indicating a time (e.g., the specific day and time of day) at which the failure occurred. In some example embodiments, the failure data is based on field failure rate reports that include an itemized reporting of each failure event corresponding to the equipment model. The field failure rate reports may be maintained in the database(s) 330. The failure data may be stored as part of a time series database that is integrated with the equipment maintenance system 300.

Other life or age indicators other than time may also be stored as part of the failure data in order to enable variations on the parameters used for generating analytical data. For example, in addition to indications of failure events being associated with time (e.g., days), indications of failure events may also be associated with other estimators of the real age of an equipment model, such as the number of operations that had been performed by the equipment model at the time the failure event occurred, the amount of matter (e.g., energy, water, oil) that had passed through the equipment model or that was otherwise processed by the equipment model at the time the failure event occurred, the amount of distance (e.g., miles) the equipment model had traveled at the time the failure event occurred, and the amount of a specific type of distance (e.g., city miles versus highway miles) the equipment model had traveled at the time the failure event occurred. Other types of life or age indicators are also within the scope of the present disclosure and may be used in place of time in the example embodiments disclosed herein.

The following notations are used herein:

| | |
|---|---|
| $\beta$ | Beta (Shape parameter) |
| $\eta$ | Eta (Scale parameter) |
| $F(t)$ | Cumulative Failure |
| $f(t)$ | Density function |
| $S(t)$ | Cumulative Survival |
| $h(t)$ | Hazard Function |
| $E(t)$ | Conditional Mean Life, given survival till t |

In some example embodiments, the training module 310 is configured to train a failure curve model for the equipment model using the obtained failure data for the equipment model. The failure curve model is configured to estimate lifetime characteristics of assets specific to a particular failure mode. A particular failure mode is a specific way in which a machine may fail, such as with respect to a particular subcomponent of the machine (e.g., radiator leak, dead battery), as opposed to a generalized overall failure of the machine that is not associated with any specific subcomponent of the machine nor any other specific reason for failure. In some example embodiments, the training module 310 estimates lifetime characteristics of assets specific to a particular failure mode using statistical and data driven models.

In some example embodiments, the analytics module 320 is configured to generate one or more types of analytical data for the equipment model using the failure curve model, as well as to use the generated analytical data in practical applications for end users. Examples of the types of analytical data that may be generated for the equipment model include, but are not limited to, the probability of failure (PoF), the remaining useful life (RUL), and the hazard function. The probability of failure is the probability that the equipment model will suffer a failure event at a particular time or at some other particular life or age indicator (e.g., at a particular number of operations). The remaining useful life is an estimate of the number of remaining years (or some other type of life or age metric) that an item, component, or system is estimated to be able to function in accordance with its intended purpose before needing maintenance, repair, or replacement given a particular time or some other particular life or age indicator. The hazard function (also called the force of mortality, instantaneous failure rate, instantaneous death rate, or age-specific failure rate) is a way to model data distribution in survival analysis and may be used to model an equipment model's chance of failure as a function of its age.

In some example embodiments, the analytics module 320 is configured to cause a visualization of one or more of the types of analytical data for the equipment model to be displayed. The visualization may be generated based on one or more visualization parameters, such as a type of analytics function or a particular failure mode. The type of analytics function defines the type of analytical data that that is to be visualized and displayed, which may include, but is not limited to, the probability of failure (PoF) the remaining useful life (RUL), and the hazard function.

Reliability Life Data Analysis refers to the study and modeling of observed product lives. Life data can be lifetimes of products in the marketplace, such as the time the product operated successfully or the time the product operated before it failed. These lifetimes can be measured in hours, miles, cycles-to-failure, stress cycles or any other metric with which the life or exposure of a product can be measured. All such data of product lifetimes can be encompassed in the term life data or, more specifically, product life data. The subsequent analysis and prediction are described as life data analysis. In the present disclosure, examples and discussions are directed to lifetimes of inanimate objects, such as equipment, components and systems as they apply to reliability engineering. However, the same concepts can be applied in other areas as well.

As will be discusses in further detail below, Weibull and Log Normal analysis may be used for failure analysis with respect to different failure modes of different equipment models. Related quantitative models, such as the binomial, Poisson, Kaplan-Meier, Gumbel extreme value and the Crow-AMSAA, may also be used for failure analysis.

The term "life data" refers to measurements of product life. Product life can be measured in hours, miles, cycles or any other metric that applies to the period of successful operation of a particular product. Since time is a common measure of life, life data points are often called "times-to-failure" and product life will be described in terms of time throughout the rest of this guide. There are different types of life data and because each type provides different information about the life of the product, the analysis method will vary depending on the data type. With "complete data," the exact time-to-failure for the unit is known (e.g., the unit failed at 100 hours of operation). With "suspended" or "right censored" data, the unit operated successfully for a known period of time and then continued (or could have continued) to operate for an additional unknown period of time (e.g., the unit was still operating at 100 hours of operation). With "interval" and "left censored" data, the exact time-to-failure is unknown but it falls within a known time range. For example, the unit failed between 100 hours and 150 hours (interval censored) or between 0 hours and 100 hours (left censored).

Statistical distributions have been formulated by statisticians, mathematicians and engineers to mathematically model or represent certain behavior. The probability density function (PDF) is a mathematical function that describes the distribution. In life data analysis, predictions are made about the life of all products in the population by fitting a statistical distribution to life data from a representative sample of units. The parameterized distribution for the dataset can then be used to estimate important life characteristics of the product such as reliability or probability of failure at a specific time, the mean life and the failure rate. Life data is available as several different types of datasets.

Figure 4:
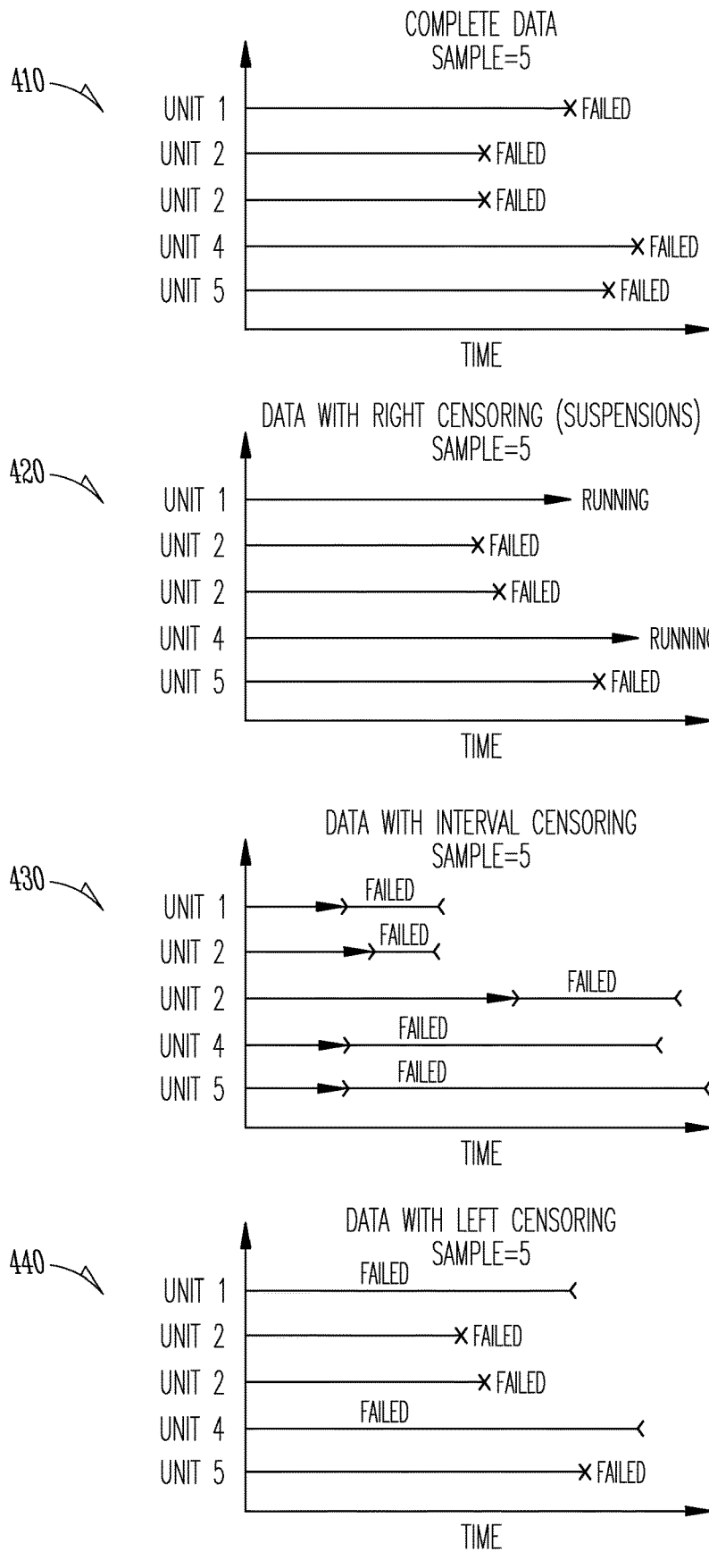
FIG. 4 illustrates different types of datasets for life data, in accordance with some example embodiments.

FIG. 4 illustrates different types of datasets for life data, in accordance with some example embodiments. The different types of datasets include complete data 410, right censored data 420, interval censored data 430, and left censored data 440. Complete data means that the value of each sample unit is observed or known. Right censored data (suspensions) are composed of units that did not fail. Interval censored data reflects uncertainty as to the exact times the units failed within an interval. This type of data frequently comes from tests or situations where the objects of interest are not constantly monitored. Left censored data, where a failure time is only known to be before a certain time. Interval censored data is often less informative compared to complete data. In some example embodiments, one objective of the equipment maintenance system 300 is to be able to determine probability of failure of a particular failure mode, and, therefore, failures pertaining to any other failure mode are interpreted or otherwise treated by the equipment maintenance system 300 as suspensions.

In some example embodiments, the equipment maintenance system 300 uses a Weibull distribution in generating analytics for a particular failure mode for a particular equipment model. Weibull distribution is a continuous probability distribution. Weibull distribution may be used to conduct life data analysis to make predictions about the life of all products in the population by fitting a statistical distribution to life data from a representative sample of units. The parameterized distribution for the data set can then be used to estimate important life characteristics of the product such as reliability or probability of failure at a specific time, the mean life and the failure rate.

In some example embodiments, Weibull analysis is used to fit and analyze life data. The Weibull distribution provides the best fit of life data, which is due in part to the broad range of distribution shapes that are included in the Weibull family. Many other distributions are included in the Weibull family either exactly or approximately, including the normal, the exponential, the Rayleigh, and sometimes the Poisson and the Binomial. If the Weibull fit is poor, other distributions may be considered unless the sample size is small (e.g., less than 21 failures).

One advantage of Weibull analysis is the ability to provide reasonably accurate failure analysis and failure forecasts with extremely small samples. Weibull analysis may include one or more of the following features: plotting the data and interpreting the plot, failure forecasting and prediction, evaluating corrective action plans, test substantiation for new designs with minimum cost, maintenance planning and cost effective replacement strategies, spare parts forecasting, warranty analysis and support cost predictions, controlling production processes, calibration of complex design systems (e.g., CAD\CAM, finite analysis, etc.), and recommendations to management in response to service problems. Weibull analysis applies to only one failure mode at a time. A single part may have several failure modes and each mode has its own Weibull plot.

Figure 5:
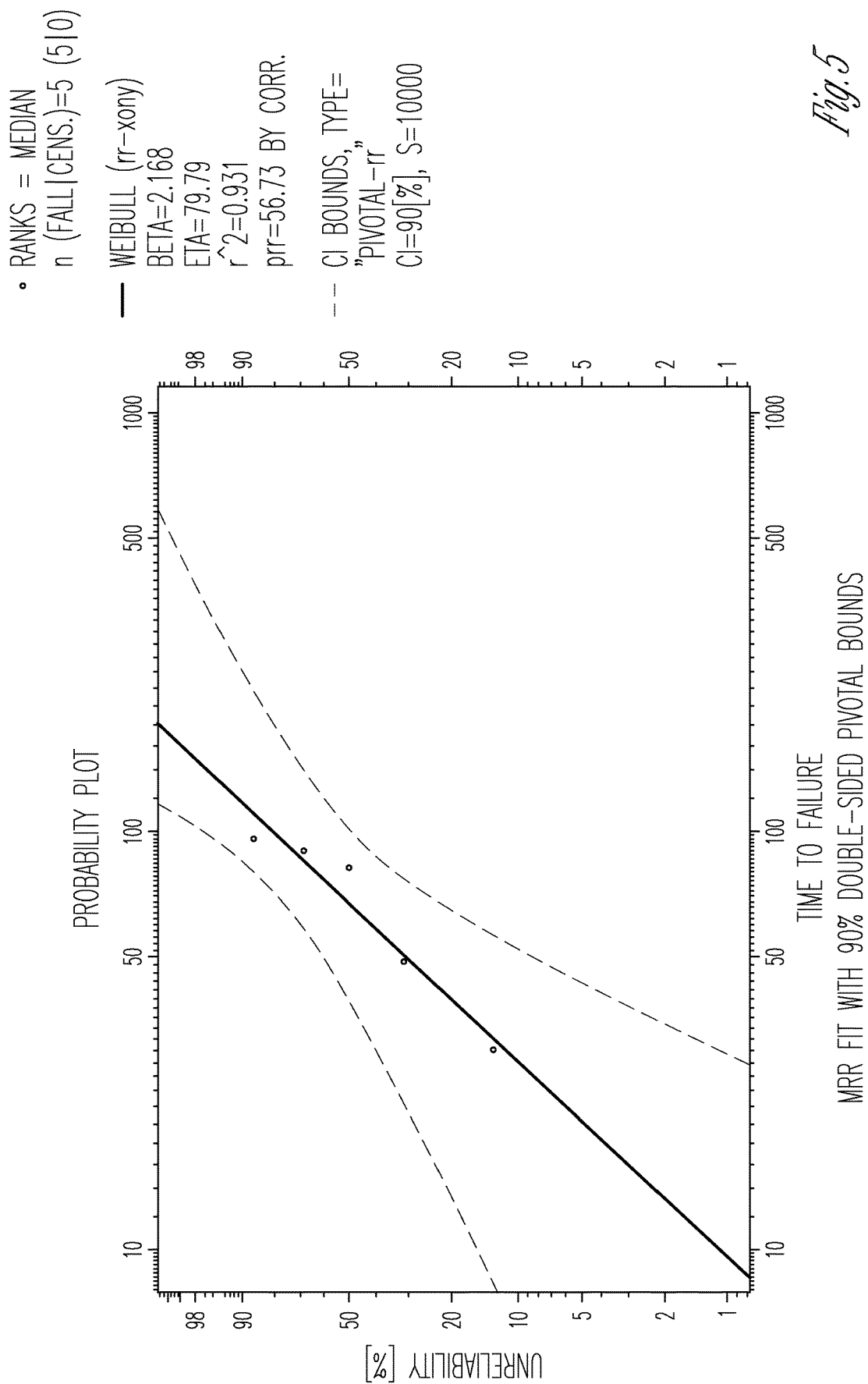
FIG. 5 illustrates a Weibull probability graph, in accordance with some example embodiments.

One engineering method that may be used for establishing the Weibull line is to plot the time to failure data on Weibull probability graphs using median rank plotting positions and regression analysis to fit the line. FIG. 5 illustrates a Weibull probability graph 500, in accordance with some example embodiments. The horizontal scale is the age or time parameter (t). This scale is logarithmic. For some assets, this could be cycles of operation, operating time, mileage etc. The vertical axis is the Cumulative Distribution Function (CDF) that defines the proportion of the parts that will fail up to age (t) in percent.

The two-parameter Weibull distribution may be used by the equipment management system 300 for life data analysis. In the 2-parameter Weibull model, the scale parameter (e.g., the characteristic life) $\eta$ defines where the bulk of the distribution lies. The shape parameter $\beta$, which is the slope of the Weibull line, defines the shape of the distribution, which shows the class of failure mode such as infant mortality, random, or wear out. The scale parameter $\eta$ is equal to the mean-time-to-failure (MTTF) when the slope, $\beta$, equals one. In order to fit a statistical model to a life data set, the parameters of the life distribution that will make the function most closely fit the data are estimated by the equipment maintenance system 300. The parameters control the shape and scale of the PDF function. Several methods have been devised to estimate the parameters that will fit a lifetime distribution to a particular data set. Some parameter estimation methods that may be used by the equipment maintenance system 300 include probability plotting, median Rank Regression on Y (RRY) and Maximum Likelihood Estimation (MLE). In some example embodiments, for small and moderate size samples (2-100), the equipment maintenance system 300 employs median rank regression (X onto Y) curve fitting using the times-to-failure as the dependent variable. The equipment maintenance system 300 may use Maximum likelihood estimation (MILE) for very large samples, over 500 failures.

In some use cases, failures are rare, thereby resulting in a moderate size sample space. Therefore, in some example embodiments, Median Rank Regression for parameter estimation is employed by the equipment maintenance system 300. Maximum likelihood estimates tend to overestimate $\beta$ with small samples. The slope of the Weibull plot is too steep. MRR provides more accurate estimates of the Weibull fp.

The two-parameter Weibull distribution may be used for life data analysis. Because life data analysis results are estimates based on the observed lifetimes of a sampling of units, there is uncertainty in the results due to the limited sample sizes. "Confidence bounds" (also called "confidence intervals") may be used to quantify this uncertainty due to sampling error by expressing the confidence that a specific interval contains the quantity of interest.

One objective of Weibull analysis is to solve problems by making estimates of parameters such as q, # and reliability based on data. One estimate is a "point estimate," a single number that might be an average or a median estimate, for example. An interval estimate is a range within which the equipment maintenance system 300 estimates the true value lies. The confidence interval is a range of values, bounded above and below, within which the true unknown value is expected to fall, thereby measuring the statistical precision of the estimate. The probability that the true value lies within the interval is either zero or 1: it does or does not fall within the interval. The fact that we do not know whether or not it lies within the interval does not alter these probabilities. Confidence is the frequency that similar intervals will contain the true value, assuming the fixed errors are negligible. Two-sided bounds are used to indicate that the quantity of interest is contained within the bounds with a specific confidence. There are many analytical methods that may be employed by the equipment maintenance system 300 to estimate these confidence intervals, including, but not limited to, beta-binomial, Fisher's matrix, likelihood ratio, Monte Carlo and pivotal.

Pivotal Bounds method utilizes Monte Carlo (MC) methods based on a "pivotal" statistic. A statistic is said to be pivotal if its sampling distribution does not depend on unknown parameters. Pivotal (MC) bounds are particularly useful for small and intermediate size samples using median rank regression. Given that PdMS failure use cases deal with a small sample size scenario, the equipment maintenance system 300 may use Pivotal (MC) for estimating the confidence bounds.

The Weibull plot have scales that transform the cumulative probability distribution into a linear scale. This plot may be inspected by the equipment maintenance system 300 to determine how well the failure data fits a straight line. If data is plotted on the transformed scale and it conforms to a straight line, that supports the supposition that the distribution is appropriate. A bad fit may relate to the physics of the failure or to the quality of the data or the distribution is not appropriate.

The coefficient of determination $R^2$ may be used to determine the goodness of fit. $R^2$ equals the percentage of the variation in the data explained by the fit to the distribution.

The Weibull cumulative distribution function refers the probability of failure which occurs with the time from 0 to t, defining the proportion of the parts that will fail up to age (t) in percent. The statistical symbol for the cumulative distribution function (CDF) is F(t), the probability of failure up to time t, and is expressed as:

$$F_{\beta,\eta}(t) = 1 - e^{-\left(\frac{t}{\eta}\right)^{\beta}}.$$

Figure 6:
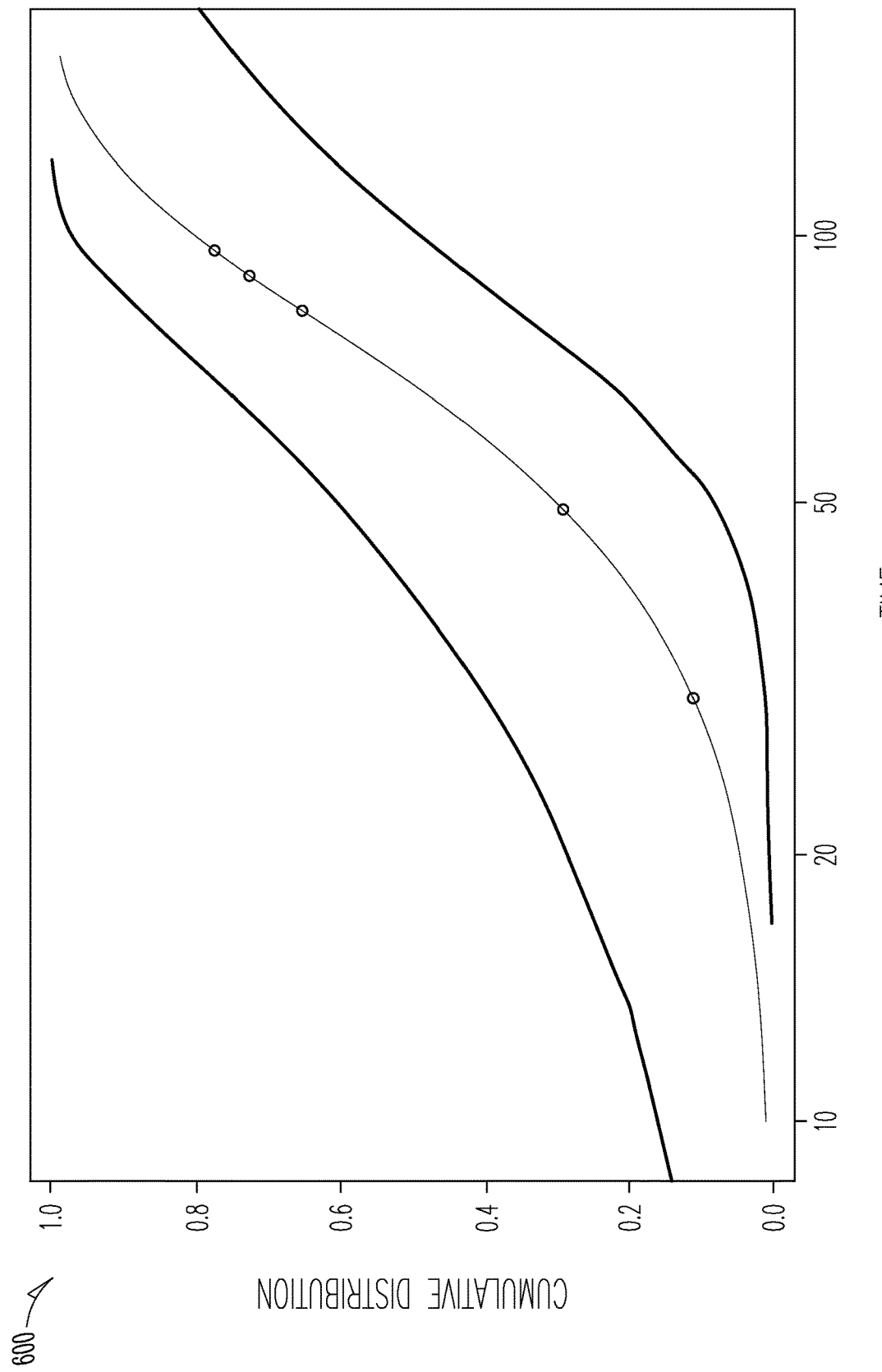
FIG. 6 illustrates a graph of a Weibull cumulative distribution function, in accordance with some example embodiments.

FIG. 6 illustrates a graph 600 of a Weibull cumulative distribution function, in accordance with some example embodiments.

Figure 7:
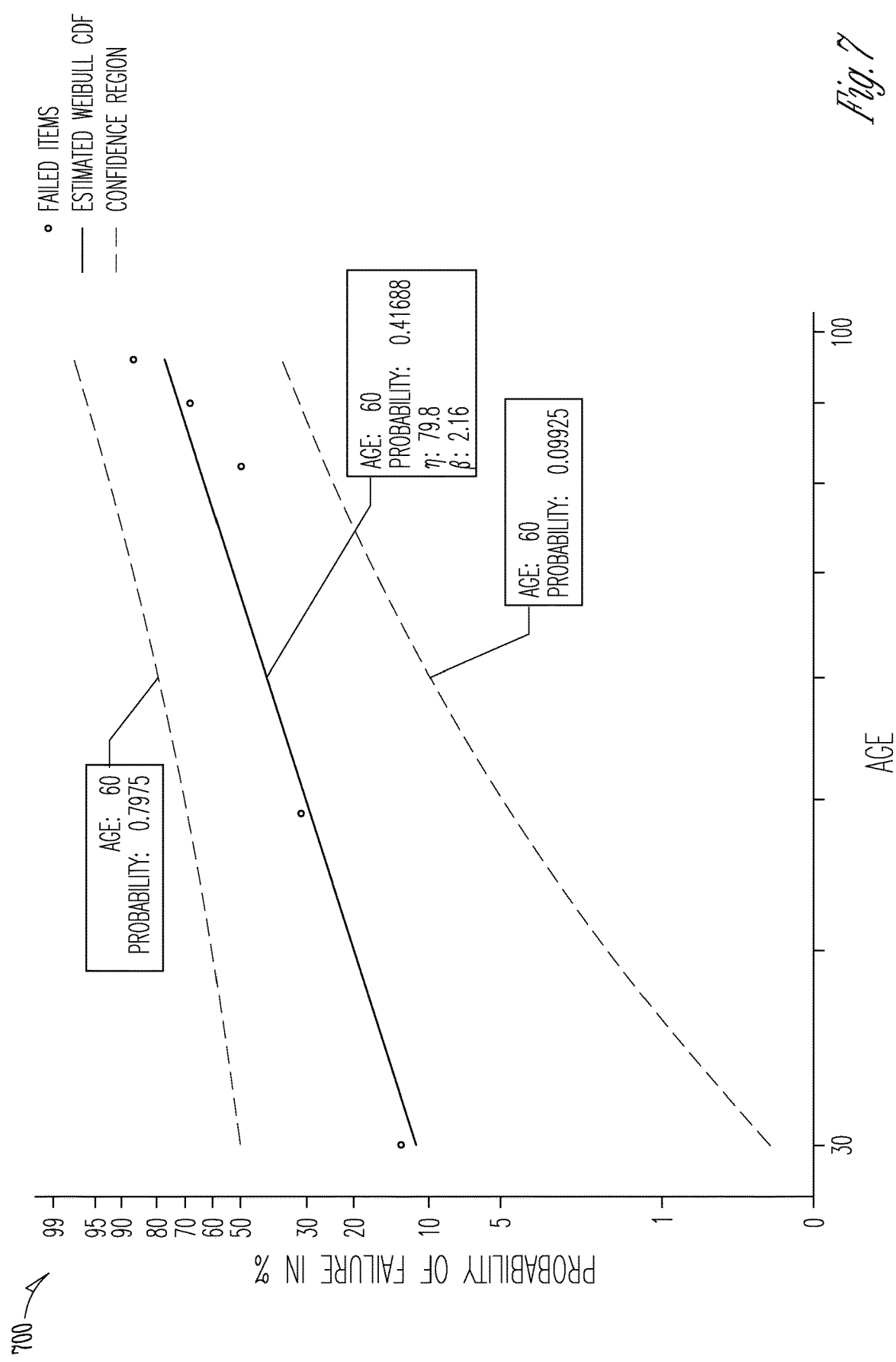
FIG. 7 illustrates a probability of failure graph, in accordance with some example embodiments.

Probability of Failure (PoF) at a given time (t) is the probability that a unit will fail at a particular point in time. Probability of failure is also known as "unreliability" and it is the reciprocal of the reliability. FIG. 7 illustrates a probability of failure graph 700, in accordance with some example embodiments. In some example embodiments, the probability of failure graph 700 comprises a Weibull plot. The Weibull plot is a log-log set of scales. The horizontal axis of the plot is time (e.g., cycles, operating or calendar time, etc.). The vertical access of the plot is logarithmic and represents the probability of failure, from near zero to 99, indicating a 1% to 99% chance of failure. All units start at time, t, zero and are working. As time goes by, the units fail until all have failed. The conditional probability of failure, given that a component has survived till t (e.g., the current age of the component), the probability of failure at given time T (e.g., a future age of the component) is expressed as:

$$F_{\beta,\eta}(T|t) = 1 - e^{-\left(\left(\frac{t}{\eta}\right)^{\beta} - \left(\frac{T}{\eta}\right)^{\beta}\right)}.$$

Weibull reliability function refers to no failure probability from time 0 to t. It is the complement of the CDF, the probability that failure will not occur up to time (t), and is expressed as:

$$R_{\beta,\eta}(t) = e^{-\left(\frac{t}{\eta}\right)^{\beta}}.$$

Figure 8:
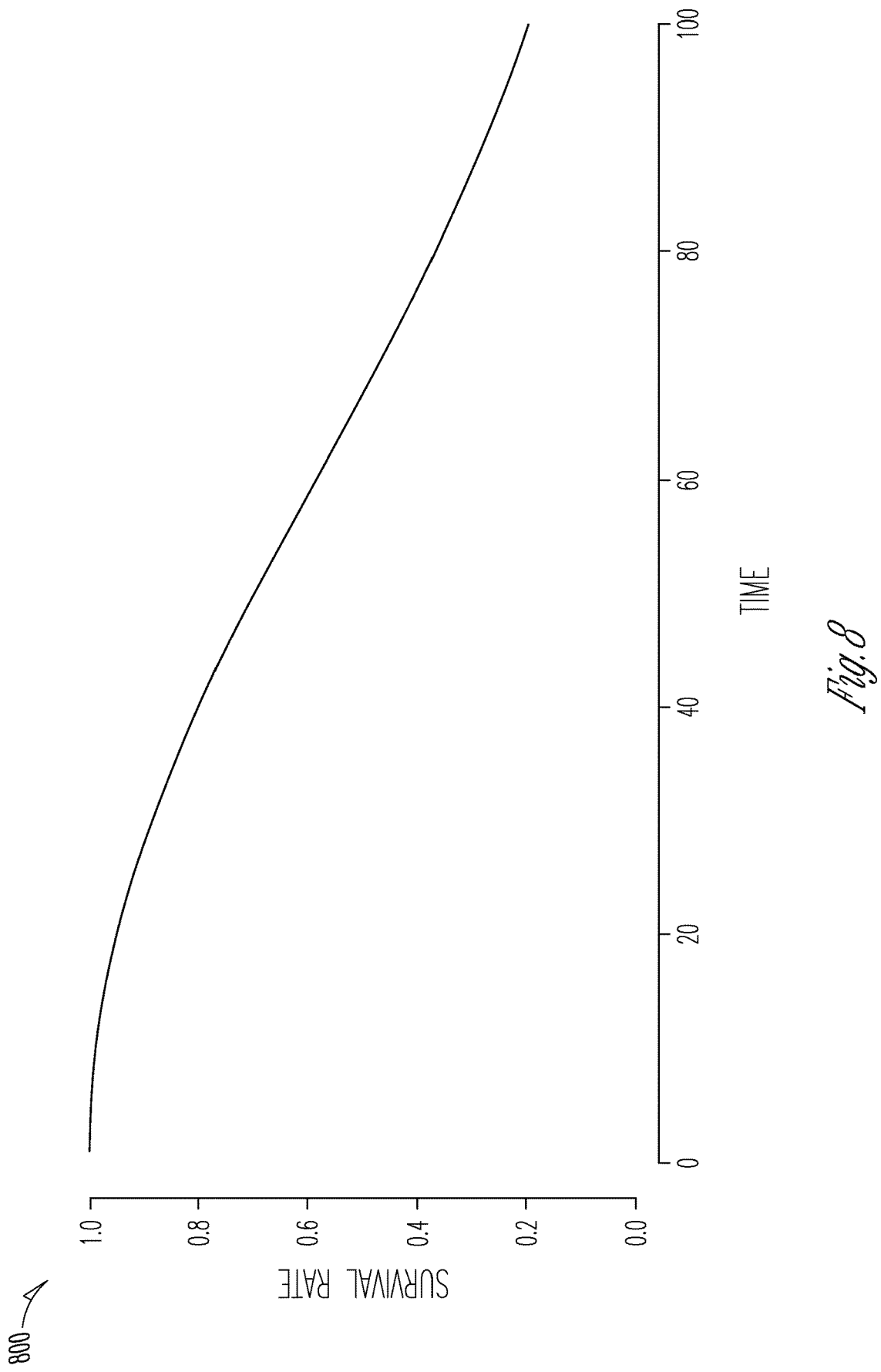
FIG. 8 illustrates a Weibull reliability or survival function graph, in accordance with some example embodiments.

FIG. 8 illustrates a Weibull reliability (or survival) function graph 800, in accordance with some example embodiments.

The Conditional Survival function provides a means to estimate the chance of survival for a duration beyond some known time t over which the item(s) have already survived. The survival function gives the probability that the asset will survive past time t. The survival function is the inverse of the cumulative density function (CDF). The cumulative density function is:

$$F_{\beta,\eta}(t) = 1 - e^{-\left(\frac{t}{\eta}\right)^{\beta}}.$$

Therefore, the survival function is:

$$S(t) = 1 - CDF = e^{-\left(\frac{t}{\eta}\right)^{\beta}}.$$

Conditional reliability is defined as the probability that a component or system will operate without failure for a mission time, x, given that it has already survived to a given time t (i.e., the probability of surviving time x, given the item has already survived over time t). This is mathematically expressed as:

$$R(x|t) = \frac{R(t+x)}{R(t)}.$$

Remaining useful life (RUL) prediction aims at assessing the performance degradation of equipment and detecting the impending failure. In one example where a component has survived at time t, the remaining useful life, RUL(t), of this component is the conditional MTTF given that the component has survived until time t.

The survival function can be used to determine the remaining useful life of a component. The conditional expectation of the truncated survival function of the Weibull is used to estimate the time to failure.

The RUL forecasts the time when it is appropriate to do maintenance, not the time until failure. The RUL is a conservative value, such that the time t, at which maintenance is performed is such that the reliability of the component is not significantly degraded.

Remaining Useful Life can be estimated using conditional Weibull distribution, where, given that a component has survived for t years, the expected remaining useful life can be determined based on that current age. The conditional mean life T of units that reach an age t is:

$$E(T|t) = \eta\Gamma\left[1 + \frac{1}{\beta}\right]e^{\left[\left(\frac{t}{\eta}\right)^{\beta}\right]}\left\{1 - \gamma\left[1 + \frac{1}{\beta}; \left(\frac{t}{\eta}\right)^{\beta}\right]\right\}.$$

Figure 9:
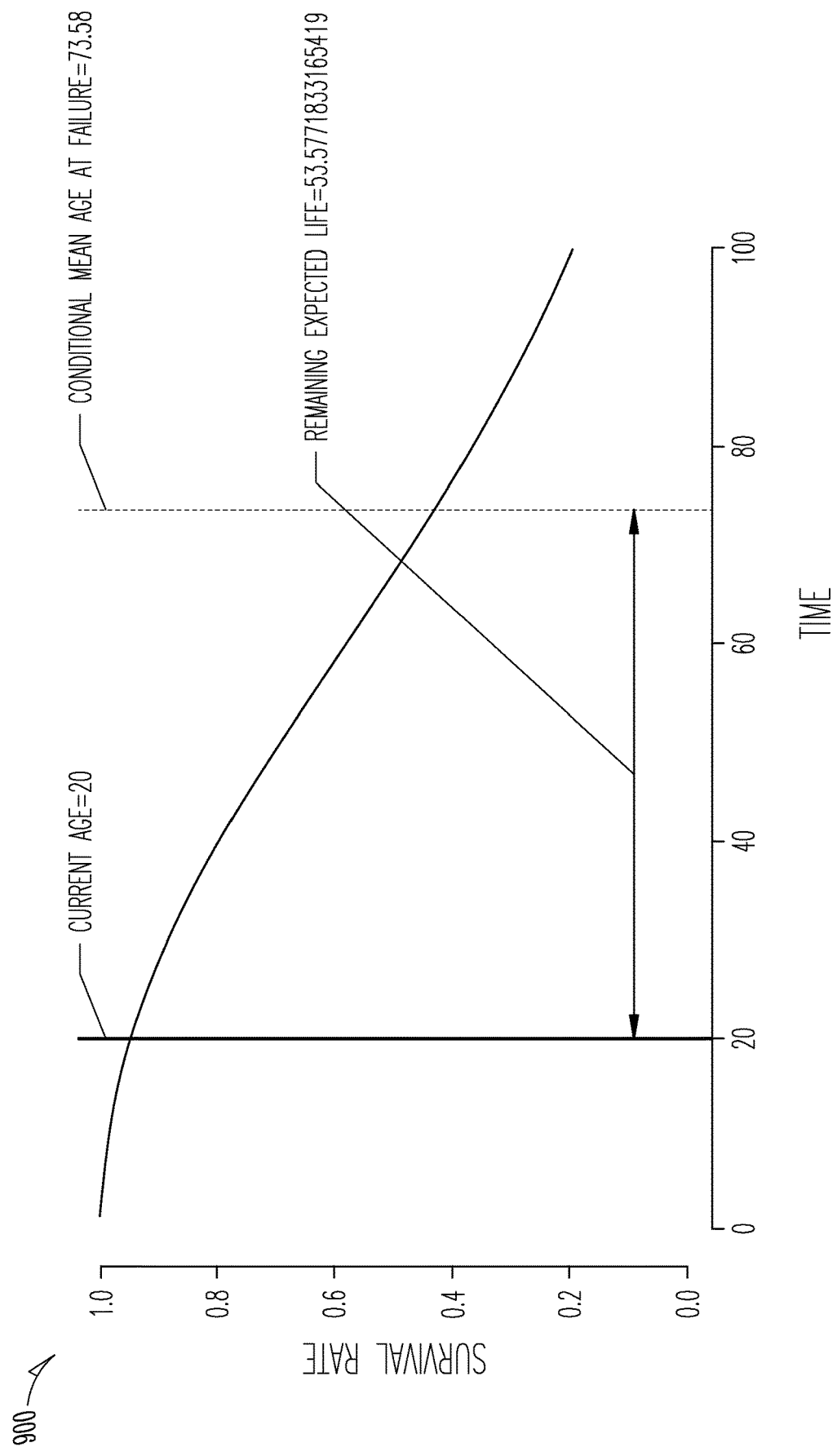
FIG. 9 illustrates a graph showing a remaining useful life for an asset, in accordance with some example embodiments.

Expected Remaining Useful Life (RUL) can be computed as E(T|t)−1. FIG. 9 illustrates a graph 900 showing a remaining useful life for an asset, in accordance with some example embodiments.

In some example embodiments, the expected remaining useful life is computed on the fly, as it is conditional to the current age of survival. In one example embodiment, this computation is implemented by mandating scoring (e.g., which computes the ERL) to be scheduled daily, where the age of survival is considered the current age of the component since the last failure. Mean Time to Failure is defined as:

$$\mu = \eta\Gamma\left(1 + \frac{1}{\beta}\right).$$

RUL at time 0 is the MTTF.

The Probability Density Function (PDF) is the derivative of the CDF with respect to time (t), and is expressed as:

$$F_{\beta,\eta}(t) = \frac{\beta}{\eta}\left(\frac{t}{\eta}\right)^{\beta-1} e^{-\left(\frac{t}{\eta}\right)^{\beta}}.$$

Figure 10:
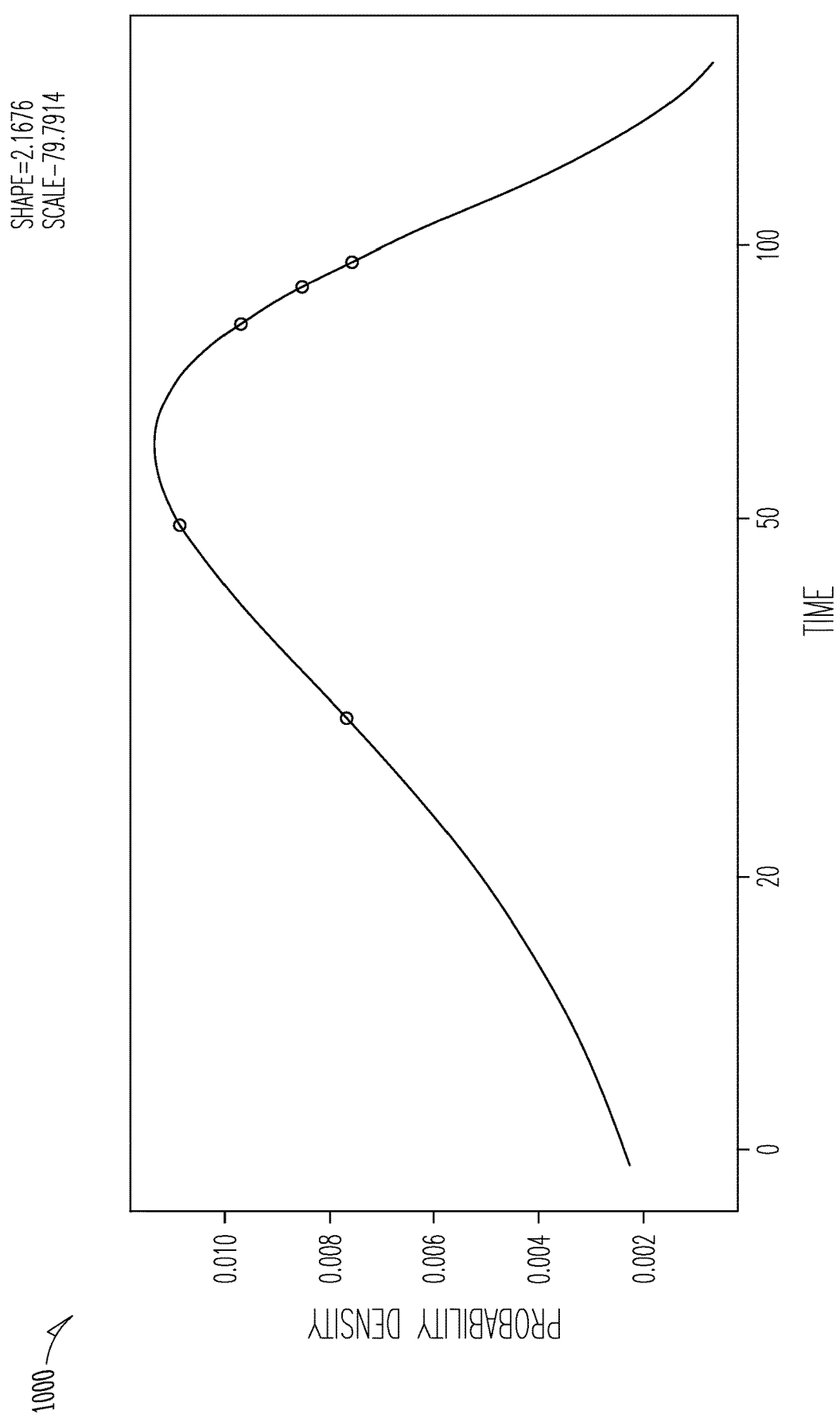
FIG. 10 illustrates a probability density function graph, in accordance with some example embodiments.
Figure 11:
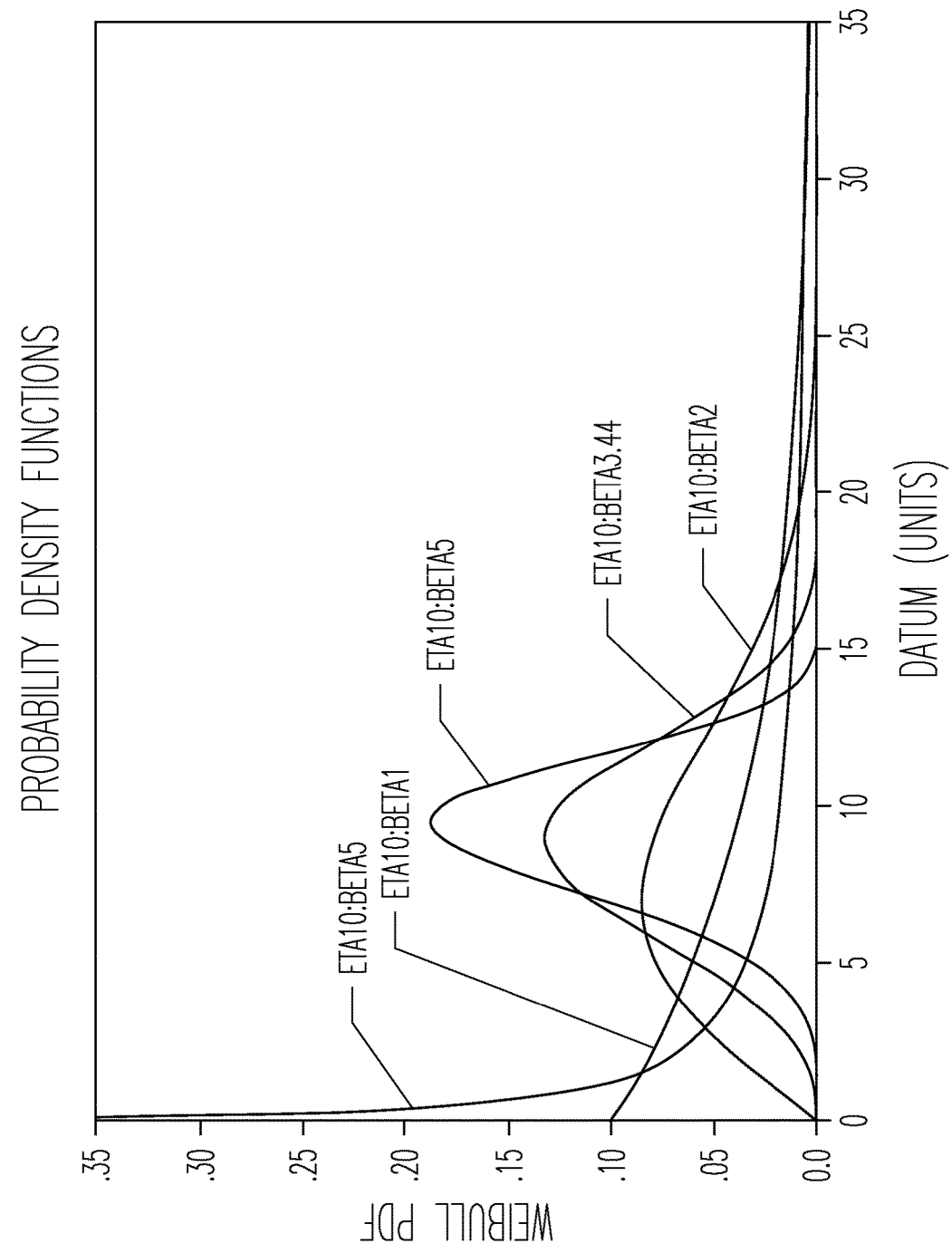
FIG. 11 illustrates a probability density function graph showing different distributions with their corresponding shape parameters, in accordance with some example embodiments.

FIG. 10 illustrates a probability density function graph 1000, in accordance with some example embodiments. β is called the shape parameter as it determines which member of the Weibull family of distributions is most appropriate. Different members have different shaped probability density functions. FIG. 11 illustrates a probability density function graph 1100 showing different distributions with their corresponding shape parameters, in accordance with some example embodiments.

The Weibull distribution gives a distribution for which the failure rate proportional to a power of time. The shape parameter β can be interpreted directly as follows:

β<1 indicates failure rate decreases with time. This happens if there is significant "infant mortality", or defective items failing early and the failure rate decreasing over time as the defective items are weeded out of the population.

β=1 indicates that the failure rate is constant over time. This might suggest random external events are causing mortality, or failure.

β>1 indicates that the failure rate increases with time. This happens if there is an "aging" process, or parts that are more likely to fail as time goes on.

Figure 12:
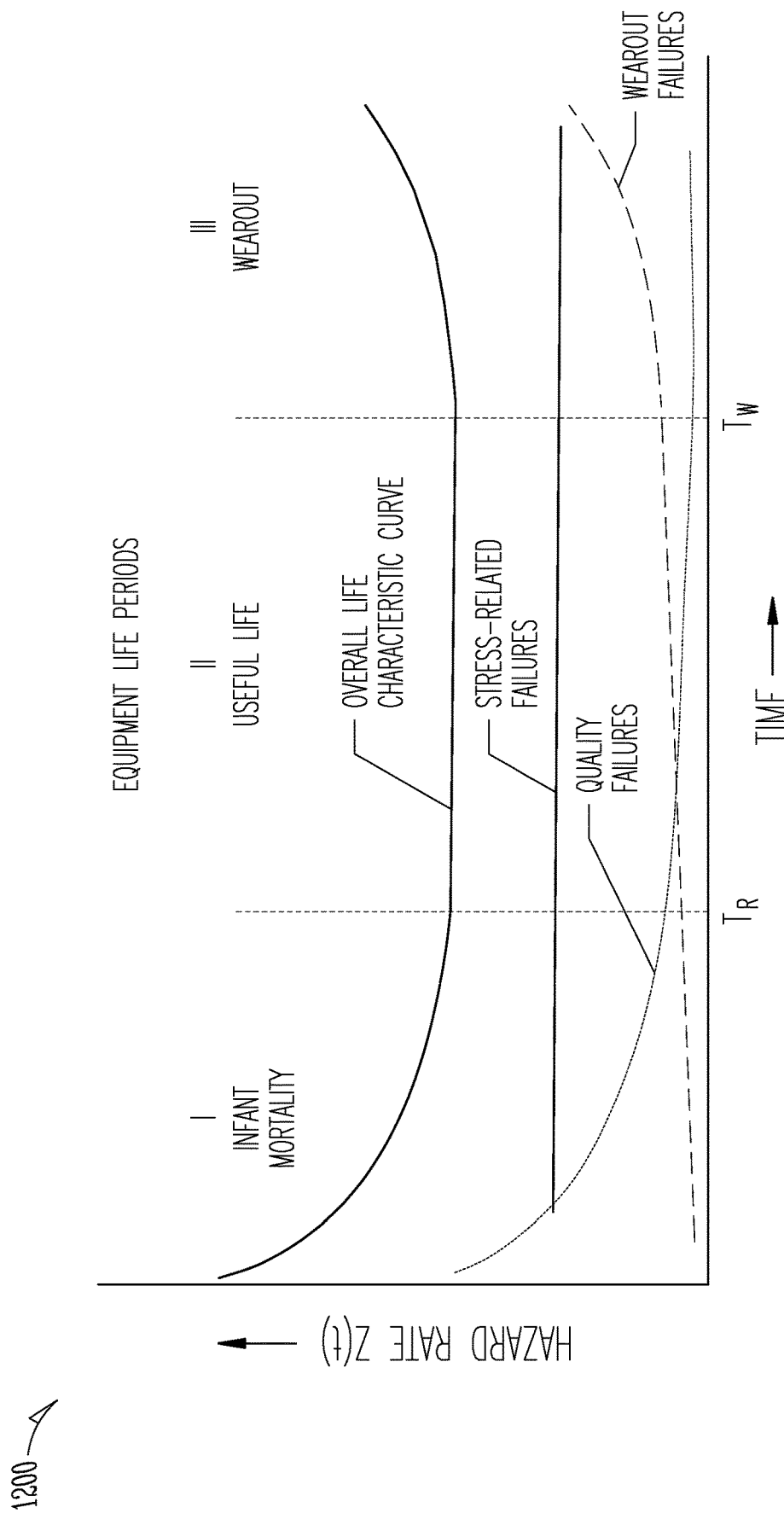
FIG. 12 illustrates a graph showing a reliability bathtub curve, in accordance with some example embodiments.

Most products exhibit failure characteristics that can be depicted using a bathtub curve, which is a composite diagram that provides a framework for identifying and dealing with all phases of the lives of parts and equipment. FIG. 12 illustrates a graph 1200 showing a reliability bathtub curve, in accordance with some example embodiments. The bathtub curve shows the relationship between beta and failures throughout the life of a component. The bathtub curve is the sum of infant mortality, random failure, and wear out curves. All life stages of the bathtub curve can be modeled with the Weibull distribution and varying values of β.

The age reliability relationship may be estimated based on the Weibull model for life data, which may be determined by the instantaneous failure rate, also known as the hazard function, which is useful in characterizing the failure behavior of a component, determining maintenance crew allocation, planning for spares provisioning, etc. Failure rate is denoted as failures per unit time and is mathematically represented as follows, representing the probability of an item failing via a specific failure mode at a specific time between installation and age t:

$$h(t) = \frac{\beta}{\eta}\left(\frac{t}{\eta}\right)^{\beta-1}.$$

Figure 13:
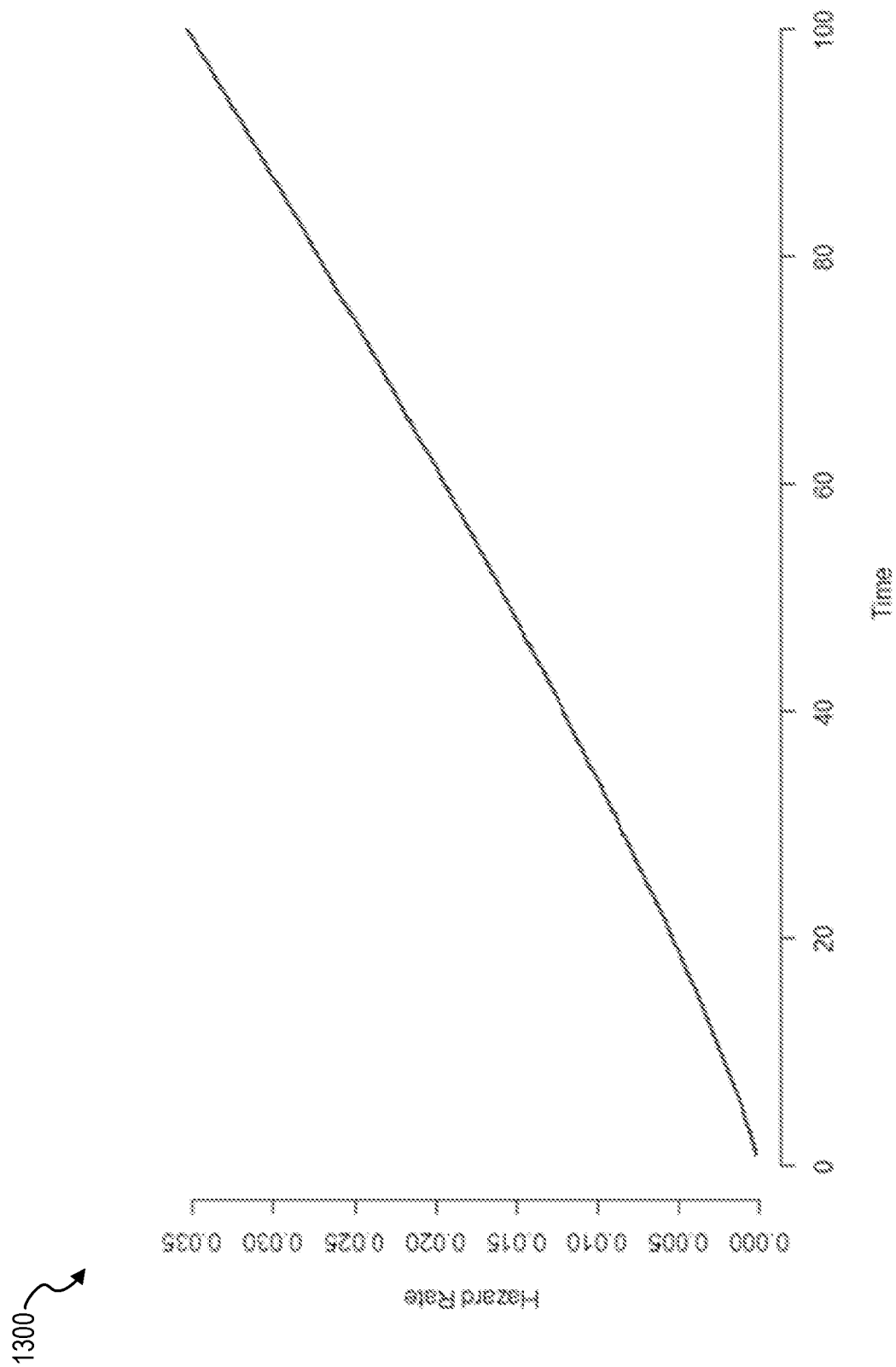
FIG. 13 illustrates a hazard function graph, in accordance with some example embodiments.
Figure 14:
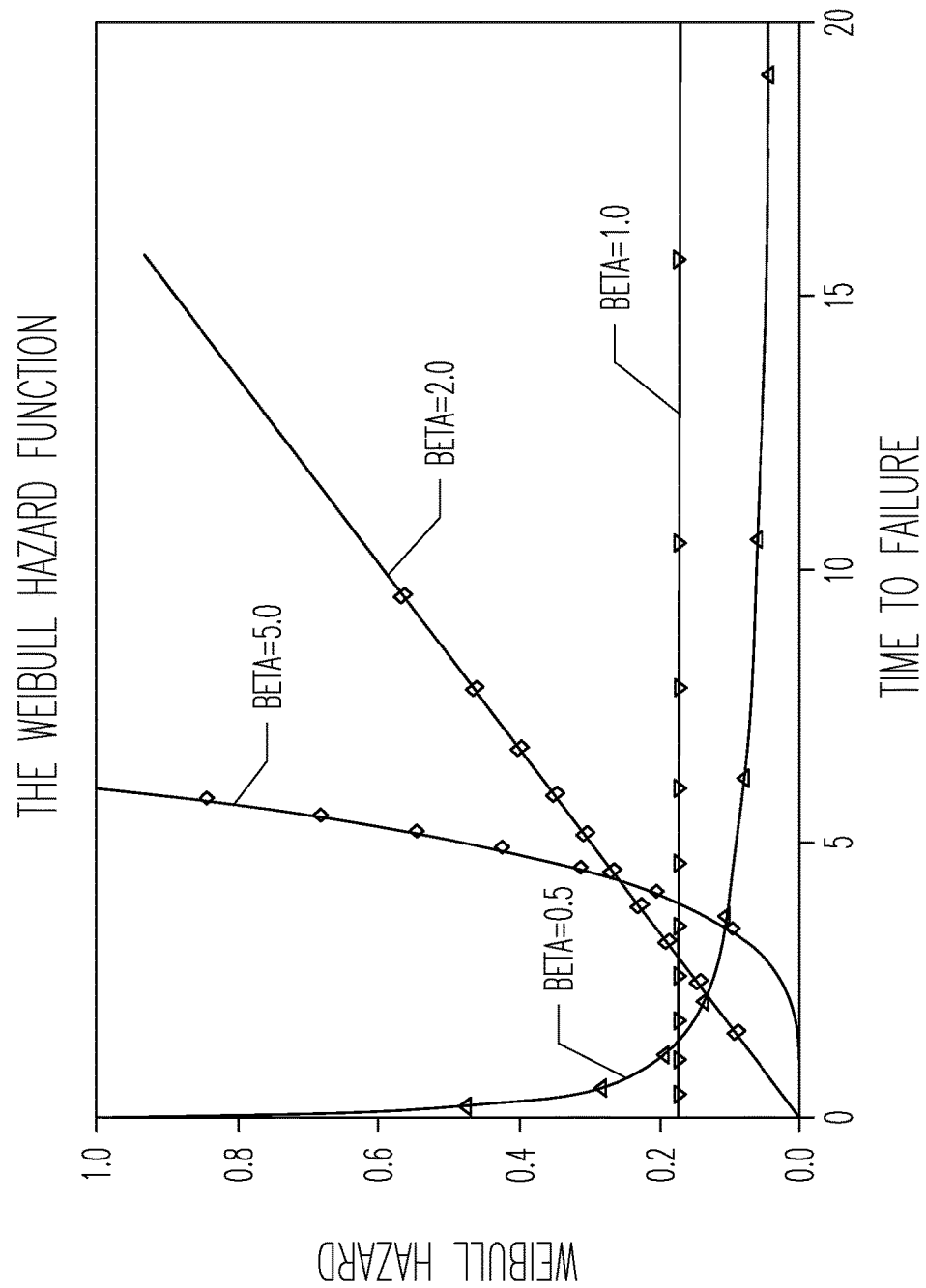
FIG. 14 illustrates a hazard function graph showing the effects of the shape parameter on the hazard function, in accordance with some example embodiments.

The hazard rate is a useful way of describing the distribution of "time to event" because it has a natural interpretation that relates to the aging of a population. It is the ratio of the Weibull probability density function and the Weibull reliability function. Weibull hazard function has practical significance, contributing to the understanding of the failure type. FIG. 13 illustrates a hazard function graph 1300, in accordance with some example embodiments. A decreasing hazard function during the early life of a product is said to correspond to infant mortality. Such a failure rate often indicates that the product is poorly designed or suffers from manufacturing defects. An increasing hazard function during later life of a product is said to correspond to wear-out failure. Such failure rate behavior often indicates that failures are due to the product wearing out. FIG. 14 illustrates a hazard function graph 1400 showing the effects of the shape parameter β on the hazard function, in accordance with some example embodiments.

The following table shows the effects of the shape parameter β on the Weibull Hazard Function:

| | Value | Property | Phase |
|---|---|---|---|
| | 0 < β < 1 | Decreasing Failure Rate | Infant Mortality |
| | β = 1 | Constant Failure Rate (Random Failures) | Useful Life |
| β > 1 | 1 < β < 2 | The failure rate increases at a decreasing rate as t increases (hazard function is concave) | Model Wearout |
| | β = 2 | Hazard function is linearly increasing, a straight-line relationship between h(t) and t | |
| | β > 2 | The failure rate increases as t increases (hazard function is convex) | |
| | 3 ≤ β ≤ 4 | The failure rate increases at an increasing rate as t increases (PDF approaches normal, symmetrical) | |
| | β > 4 | End of Life | |

The first look at the Weibull plot answers two questions: (1) how good is the fit; and (2) what is the beta, the slope. The Weibull plot provides clues about the failure mechanism, since different slopes, betas, imply different classes of failure modes. The bathtub curve shows the relationship between beta and failures throughout the life of a component. The "hazard rate" is the instantaneous failure rate.

In some example embodiments, the failure curve analysis has one model per failure mode. In some example embodiments, the life data considered for the analysis would include complete data (run to failure) as well as right censored data (suspensions). In some example embodiments, the failure modes are assumed to be independent and identically distributed. In some example embodiments, the equipment management system 300 captures the age at failure (which includes factoring in any non-operation or the actual uptime is crucial), which is a part of data preparation outside of the scope of the algorithm. Likewise, suspensions may be appropriately considered. Uptimes of repairable systems may also be considered, where repairs are considered to bring the state of the component to as good as new.

In some example embodiments, the equipment management system 300 provides a novel pipeline for an end-to-end system with the ability to assess lifetime characteristics of assets for a specific failure mode. This pipeline helps in automating reliability predictions, such as predicting remaining useful life and probability of failure for assets when subjected to specific failure modes.

Figure 15A:
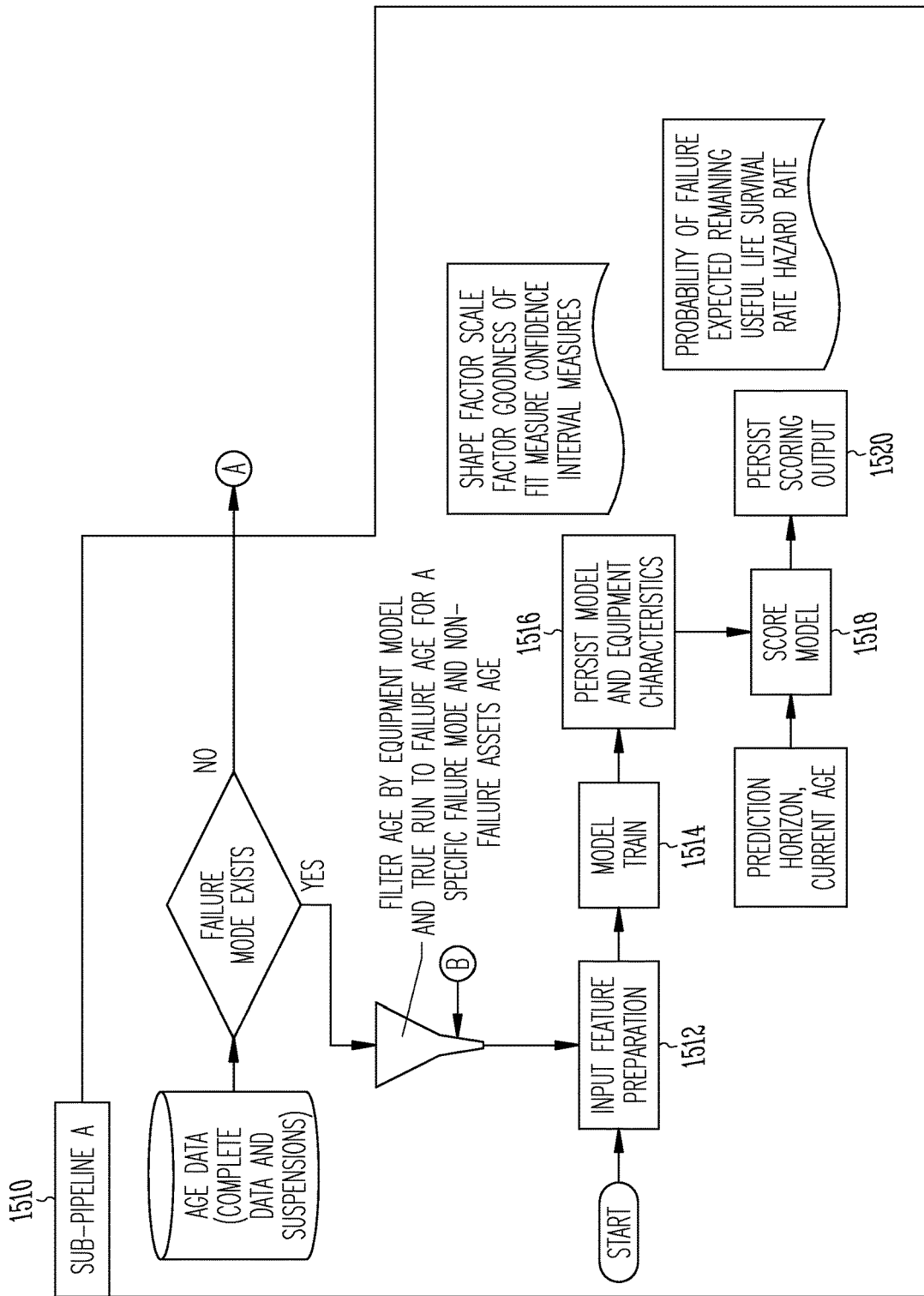
FIGS. 15A and 15B illustrate an algorithmic pipeline for predicting failure mode specific reliability characteristics of tangible equipment assets using parametric probability models, in accordance with some example embodiments.
Figure 15B:
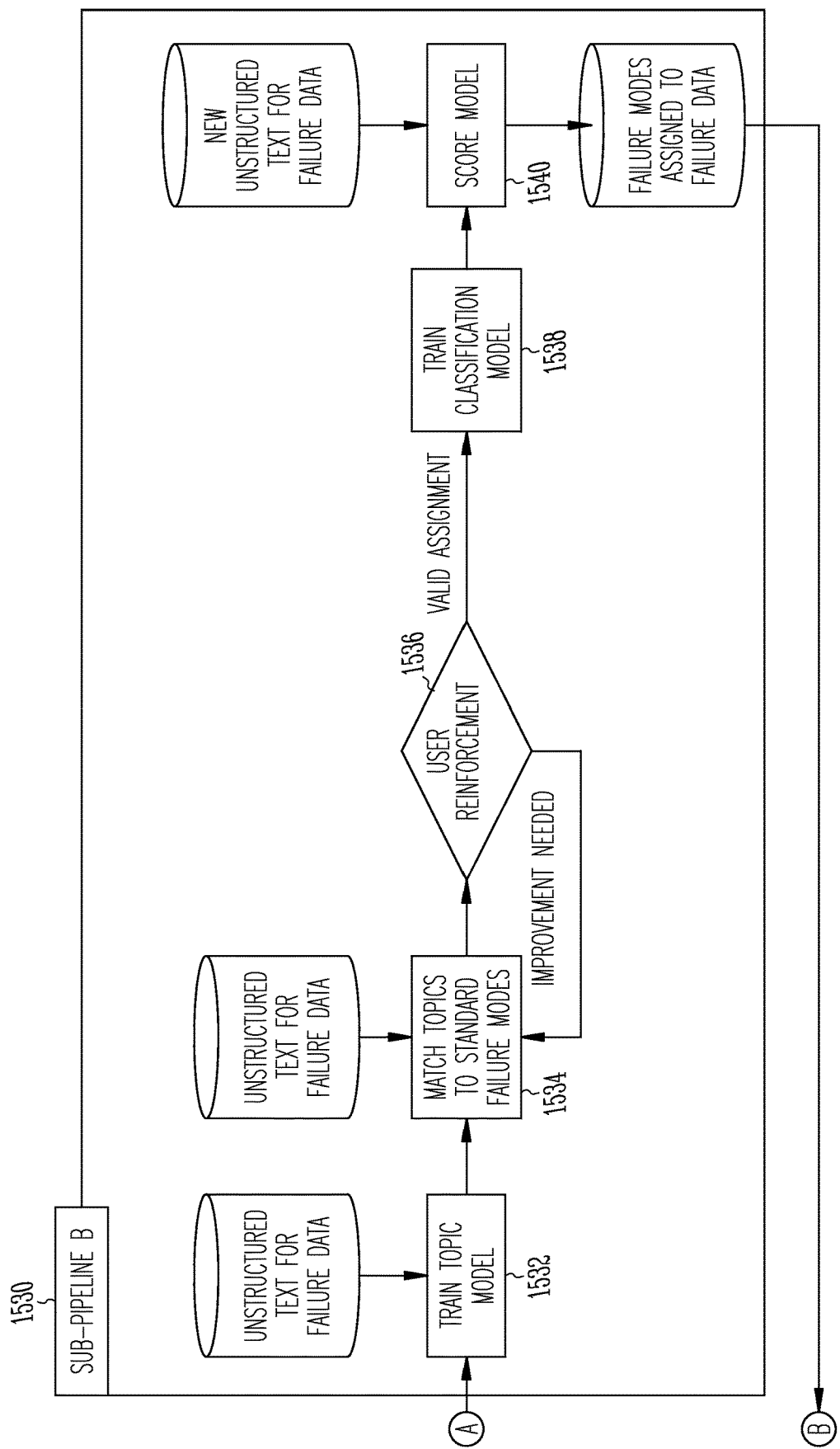

FIGS. 15A and 15B illustrate an algorithmic pipeline 1500 for predicting failure mode specific reliability characteristics of tangible equipment assets using parametric probability models, in accordance with some example embodiments. In some example embodiments, the algorithmic pipeline comprises a sub-pipeline A 1510 and a sub-pipeline B 1530.

The sub-pipeline A is configured to automate computing the probability of failure, given a prediction horizon, and the remaining useful life of an asset, given the current age. The trigger for the sub-pipeline A is the user selection of an equipment model and a specific failure mode for which the lifetime characteristics would be evaluated. The timeline for when the age data is to be considered for training is selected and a frequency for training and scoring is chosen. A prediction horizon is configured for how far in the future a probability needs to be computed relative to the current age.

Figure 16:
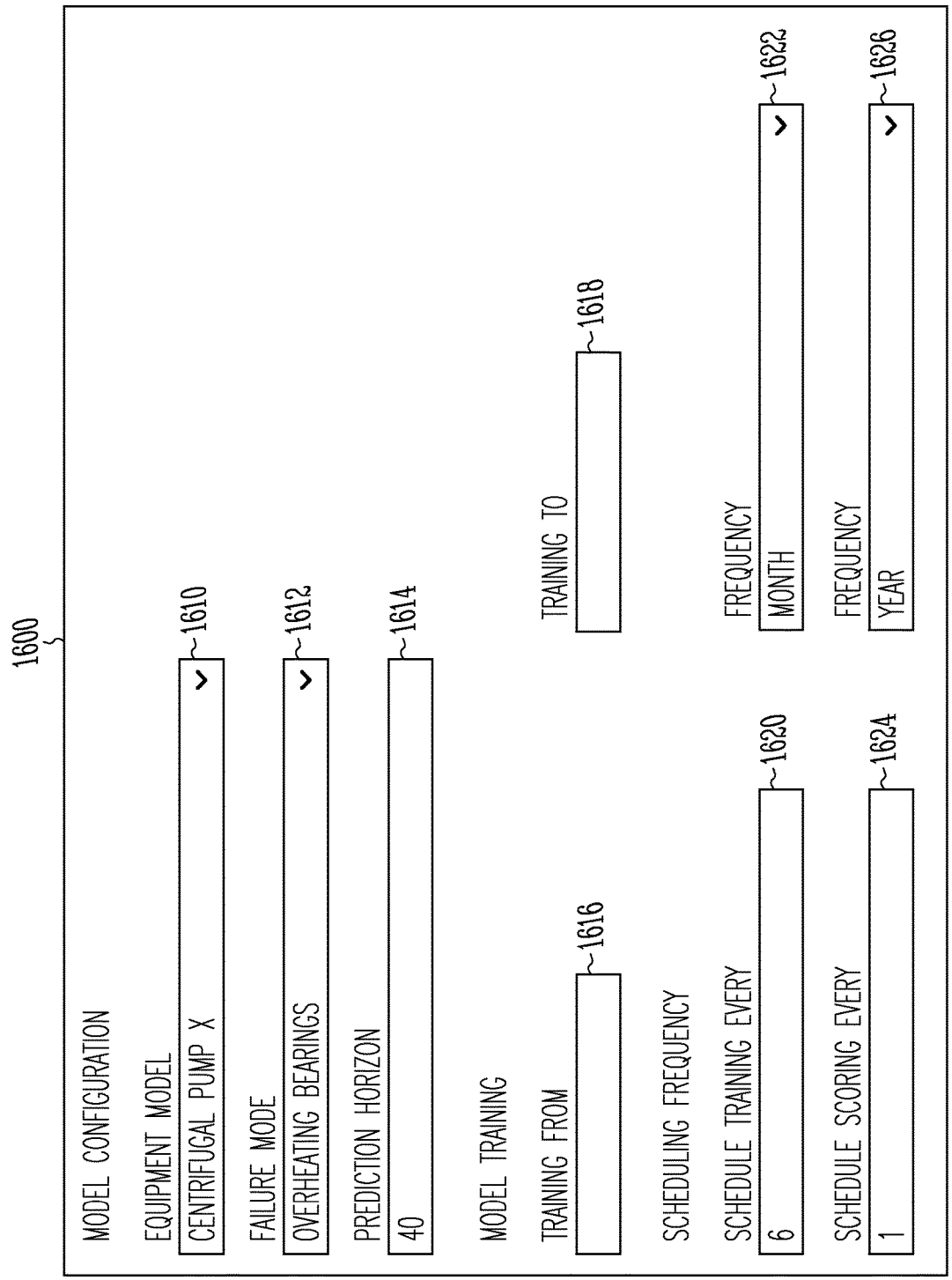
FIG. 16 illustrates a graphical user interface for configuring parameters for the algorithmic pipeline, in accordance with some example embodiments.

FIG. 16 illustrates a graphical user interface (GUI) 1600 for configuring parameters for the algorithmic pipeline 1500, in accordance with some example embodiments. In some example embodiment, the GUI 1600 comprises user interface elements configured to enable the user to configure parameters of the algorithmic pipeline 1500. For example, the GUI 1600 may comprise a user interface element 1610 configured to enable the user to select or otherwise input an equipment model (e.g., a drop-down menu from which the user can select an equipment model from a plurality of different equipment models), a user interface element 1612 configured to enable the user to select or otherwise input a failure mode (e.g., a drop-down menu from which the user can select a failure mode from a plurality of different failure modes), a user interface element 1614 configured to enable the user to select or otherwise input a prediction horizon, user interface elements 1616 and 1618 configured to enable the user to select or otherwise input a time period for the training of the model, user interface elements 1620 and 1622 configured to enable the user to select or otherwise input a schedule for training the model, and user interface elements 1624 and 1626 configured to enable the user to select or otherwise input a schedule for scoring the model.

Referring back to the sub-pipeline A of the algorithmic pipeline 1500 in FIG. 15, at operation 1512, the equipment maintenance system 300 prepares input data, which may comprise complete data and suspensions in a format suited for the parametric model fitting. The input data may be stored and accessed from a database. At operation 1514, the equipment maintenance system 300 trains a model, fitting the prepared input data to a probability distribution in order to estimate parameters or other characteristics of the equipment model. The characteristics that are estimated may include, but are not limited to, a shape parameter $\beta$, a scale parameter $\eta$, a Goodness of Fit measure $R^2$, and one or more confidence interval measures. This model including the estimated characteristics is then persisted at operation 1516. At the scheduled frequency of scoring, at operation 1518, the current age of the asset is automatically extracted for the equipment model, in conjunction with the configured prediction horizon, and, using the stored model parameters, the probability of failure, remaining useful life, survival rate and hazard rate are computed. One or more visual representations of one or more of these computations are then presented to the user at operation 1520.

The sub-pipeline B of the algorithmic pipeline 1500 can be triggered in an event that failure modes are not present in the system, to automate its computation, and to enable the end user to use the solution mentioned in the sub-pipeline A. The idea is to mine for this useful information in millions of lines of unstructured data entered by maintenance/service technicians when documenting the failure. The trigger for the sub-pipeline B is a determination of non-availability of failure modes for the equipment model considered in the sub-pipeline A. The input data for this is the unstructured data related to the failures. The timeline for when the failure text is to be considered for training is selected and a frequency for training and scoring is chosen, such as via the GUI 1600 in FIG. 16. At operation 1532, the model is trained to extract topics from the unstructured data related to failures, using algorithms such as Latent Dirchlet Allocation, Latent Semantic Analysis, Probabilistic Latent Semantic Analysis, such that each failure is assigned a topic. Once the topics are extracted, each topic is mapped to the closest known Standard Failure mode by the pipeline at operation 1534. In some example embodiments, an optional operation 1536 in the pipeline is added to introduce user validation, where a user is prompted to review the topics (and the keywords associated with the topics) to validate if it has been matched to the right Failure Mode. Once the topic to failure assignment is known from operation 1532 and topic to failure mode assignment is performed at operation 1534, failures are thus mapped to failure modes with the trained data. To operationalize this knowledge learned in training and to ensure future failures created have failure modes automatically assigned to them, a classification model is trained, at operation 1538, to now learn characteristics of failure from the failure to failure mode assignments in order to apply this knowledge to future failures. At the scheduled frequency of scoring, at operation 1540, new failures created will be applied against the trained model to continuously assign failure modes, thereby ensuring there is a failure mode available to select when triggering the sub-pipeline A of the algorithmic pipeline 1500.

The equipment maintenance system 300 is configured to generate analytics and to use the generated analytics in practical applications for end users. Examples of such analytics include, but are not limited to, the cumulative distribution function, the probability of failure, the survival or reliability function, the expected remaining useful life, the probability density function, and the hazard function.

The cumulative distribution function may comprise a Weibull cumulative distribution function, which provides the probability of failure which occurs with the time from 0 to t, in other words defines the proportion of the parts that will fail up to age (t) in percent. The statistical symbol for the CDF is F(t):

$$F_{\beta,\eta}(t) = 1 - e^{-\left(\frac{t}{\eta}\right)^{\beta}},$$

where $\beta$ is the shape and $\eta$ is the scale.

The probability of failure at a given time is the probability that a unit will fail at a particular point in time. Probability of failure is also known as "unreliability" and it is the reciprocal of the reliability. The probability of failure may be expressed as:

$$F_{\beta,\eta}(T|t) = 1 - e^{-\left(\left(\frac{t}{\eta}\right)^{\beta} - \left(\frac{T}{\eta}\right)^{\beta}\right)},$$

where $\beta$ is the shape, $\eta$ is the scale, t is the current age, and T is the future age.

The survival or reliability function may comprise a Weibull reliability function, which refers to no failure probability from time 0 to 1. It is the complement of the CDF, the probability that failure will not occur up to time (t). The reliability function may be expressed as:

$$R_{\beta,\eta}(t) = e^{-\left(\frac{t}{\eta}\right)^{\beta}},$$

$\beta$ is the shape, $\eta$ is the scale, and t is the current age.

The expected remaining useful life can be estimated using conditional Weibull distribution, implying that, given that an item has survived for t years, what is the expected remaining useful life. The expected remaining useful life may be expressed as.

$$E(T|t) = \eta \Gamma\left[1 + \frac{1}{\beta}\right] e^{\left[\left(\frac{t}{\eta}\right)^{\beta}\right]} \left\{1 - \gamma\left[1 + \frac{1}{\beta}; \left(\frac{t}{\eta}\right)^{\beta}\right]\right\},$$

where $\beta$ is the shape, $\eta$ is the scale, and t is the current age.

The probability density function is the derivative of the CDF with respect to time (t) and may be expressed as:

$$F_{\beta,\eta}(t) = \frac{\beta}{\eta}\left(\frac{t}{\eta}\right)^{\beta-1} e^{-\left(\frac{t}{\eta}\right)^{\beta}},$$

where $\beta$ is the shape, $\eta$ is the scale, and t is the current age.

The hazard function may comprise a Weibull Hazard function, which is the ration of the Weibull probability density function and the Weibull reliability function. The hazard function may be expressed as:

$$h(t) = \frac{\beta}{\eta}\left(\frac{t}{\eta}\right)^{\beta-1},$$

where $\beta$ is the shape, $\eta$ is the scale, and t is the current age.

Referring back to FIG. 3, in some example embodiments, the training module 310 is configured to receive, from a computing device of a user, a model training configuration entered by the user via a user interface displayed on the computing device. For example, the training module 310 may display the GUI 1600 shown in FIG. 16 and receive the model training configuration entered by the user via the GUI 1600. In some example embodiments, the model training configuration comprises an identification of an equipment model selected from a plurality of different equipment models (e.g., via the user interface element 1610 in FIG. 16), an identification of a failure mode selected from a plurality of different failure modes of the selected equipment model (e.g., via the user interface element 1612 in FIG. 16), and training schedule data (e.g., via one or more of the user interface elements 1616, 1618, 1620, and 1622 in FIG. 16). The plurality of different failure modes correspond to different specific ways in which the selected equipment model is capable of failing. In some example embodiments, the training schedule data indicates a time at which to train a failure curve model for the selected failure mode of the selected equipment model. The training schedule data may indicate a frequency with which to train the failure curve model for the selected failure mode of the selected equipment model. However, other types of training schedule data are also within the scope of the present disclosure.

In some example embodiments, the training module 310 is configured to receive, from the computing device of the user, a data generation configuration entered by the user via a user interface displayed on the computing device, such as via the GUI 1600 in FIG. 16. The data generation configuration may comprise generation schedule data indicating a time at which to generate analytical data using the trained failure curve model. In some example embodiments, the generation schedule data indicates a frequency with which to generate the analytical data using the trained failure curve model. However, other types of generation schedule data are also within the scope of the present disclosure. In FIG. 16, the user may enter the data generation configuration using the user interface elements 1624 and 1626 to indicate the frequency with which to generate the analytical data using the trained failure curve model.

In some example embodiments, the training module 310 is configured to train the failure curve model based on the model training configuration at the time indicated by the training schedule data using failure event data for the selected failure mode of the selected equipment model. In some example embodiments, the failure curve model is configured to estimate lifetime failure data for the selected failure mode of the selected equipment model. The lifetime failure data may indicate a probability of the selected equipment model failing in the specific way of the selected failure mode at any specific point in time during a lifetime of a physical instance of the equipment model. In some example embodiments, the failure event data identifies events in which one or more physical instances of the selected equipment model suffered a functional failure in the specific way of the selected failure mode and comprises time data indicating a corresponding time at which each of the plurality of events occurred (e.g., date, time of day). The failure data may be based on failure events for different physical instances of the same equipment model. For example, an organization may have multiple hydraulic pumps of the same model, and the equipment maintenance system 300 may collect and aggregate all of the data on the failure events for those multiple hydraulic pumps to form the failure data for that specific hydraulic pump model.

In some example embodiments, the failure curve model comprises a parametric model. However, other types of failure curve models are also within the scope of the present disclosure. In some example embodiments, the training of the failure curve model comprises determining a shape parameter and a scale parameter for the failure curve model based on a fitting of the failure event data to a continuous probability distribution, and then storing the shape parameter and the scale parameter in a database in association with the selected failure mode of the selected equipment model. The stored shape parameter and the stored scale parameter may subsequently be accessed for use in generating analytical data for the selected failure mode of the selected equipment model. In some example embodiments, the continuous probability distribution comprises a Weibull distribution. However, other types of continuous probability distributions are also within the scope of the present disclosure.

In some example embodiments, the analytics module 320 is configured to generate analytical data for the selected failure mode of the selected equipment model using the trained failure curve model. In some example embodiments, the analytical data indicates at least a portion of the lifetime failure data for the selected equipment model corresponding to the selected failure mode. In some example embodiments, the analytical data is generated at the time indicated by the generation schedule data based on the data generation configuration. Examples of the types of analytical data that may be generated for the equipment model include, but are not limited to, the probability of failure (PoF), the remaining useful life (RUL), and the hazard function. The probability of failure is the probability that the equipment model will suffer a failure event at a particular time or at some other particular life or age indicator (e.g., at a particular number of operations). The remaining useful life is an estimate of the number of remaining years (or some other type of life or age metric) that an item, component, or system is estimated to be able to function in accordance with its intended purpose before needing maintenance, repair, or replacement given a particular time or some other particular life or age indicator. The hazard function (also called the force of mortality, instantaneous failure rate, instantaneous death rate, or age-specific failure rate) is a way to model data distribution in survival analysis and may be used to model an equipment model's chance of failure as a function of its age.

In some example embodiments, the analytics module 320 is configured to cause a visualization of the generated analytical data to be displayed on the computing device or on another computing device. The visualization may be generated based on one or more visualization parameters, such as a type of analytics function (e.g., PoF, RUL), a particular failure mode, a specific user selected point on the visualization (e.g., a user selected point on a curve of a graph), a threshold level for a probability of failure for the equipment model, or a confidence interval value for the analytical data. In some example embodiments, the visualization of the analytical data comprises a graph indicating corresponding probabilities of failure by the corresponding specific manner or way of failing of the failure mode for the lifetime of the physical instance of the equipment model. For example, the visualization may comprise any of the graphs shown in FIGS. 5-14. However, other types of visualizations are also within the scope of the present disclosure.

Figure 17:
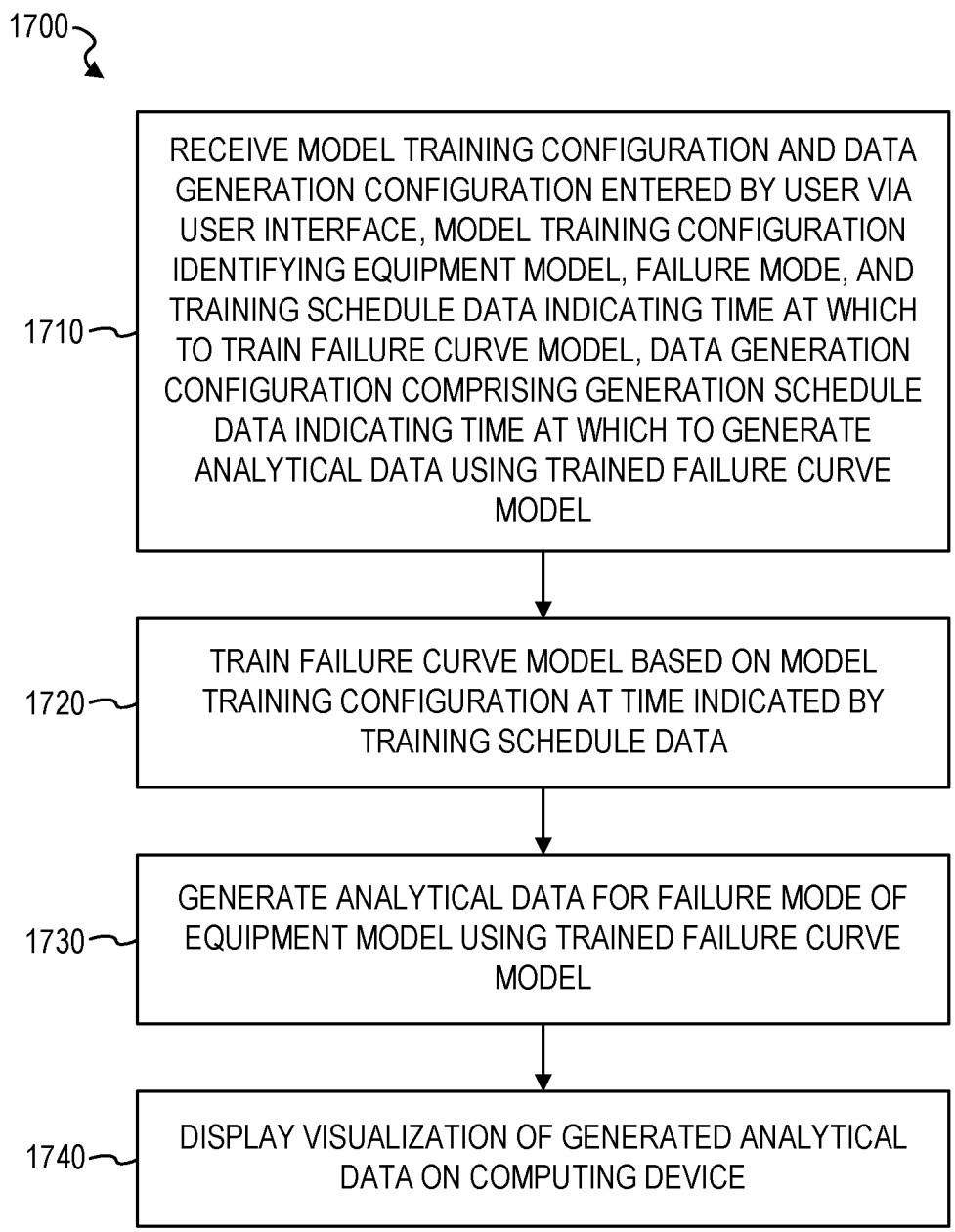
FIG. 17 is a flowchart illustrating a method of predicting failure mode specific reliability characteristics of tangible equipment assets using parametric probability models, in accordance with some example embodiments.

FIG. 17 is a flowchart illustrating a method 1700 of predicting failure mode specific reliability characteristics of tangible equipment assets using parametric probability models, in accordance with some example embodiments. The method 1700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1700 are performed by the equipment maintenance system 300 of FIG. 3 or any combination of one or more of its modules 310 and 320. However, other implementations are also within the scope of the present disclosure.

At operation 1710, the equipment maintenance system 300 receives, from a computing device of a user, a model training configuration entered by the user via a user interface displayed on the computing device. In some example embodiments, the model training configuration comprises an identification of an equipment model selected from a plurality of different equipment models, an identification of a failure mode selected from a plurality of different failure modes of the selected equipment model, and training schedule data. The plurality of different failure modes correspond to different specific ways in which the selected equipment model is capable of failing. In some example embodiments, the training schedule data indicates a time at which to train a failure curve model for the selected failure mode of the selected equipment model. The training schedule data may indicate a frequency with which to train the failure curve model for the selected failure mode of the selected equipment model. However, other types of training schedule data are also within the scope of the present disclosure.

In some example embodiments, at operation 1710 or in a separate operation at a separate time, the equipment maintenance system 300 receives, from the computing device of the user, a data generation configuration entered by the user via the user interface displayed on the computing device. The data generation configuration may comprise generation schedule data indicating a time at which to generate analytical data using the trained failure curve model. In some example embodiments, the generation schedule data indicates a frequency with which to generate the analytical data using the trained failure curve model. However, other types of generation schedule data are also within the scope of the present disclosure.

At operation 1720, the equipment maintenance system 300 trains the failure curve model based on the model training configuration at the time indicated by the training schedule data using failure event data for the selected failure mode of the selected equipment model. In some example embodiments, the failure curve model is configured to estimate lifetime failure data for the selected failure mode of the selected equipment model. The lifetime failure data may indicate a probability of the selected equipment model failing in the specific way of the selected failure mode at any specific point in time during a lifetime of a physical instance of the equipment model. In some example embodiments, the failure event data identifies events in which one or more physical instances of the selected equipment model suffered a functional failure in the specific way of the selected failure mode and comprises time data indicating a corresponding time at which each of the plurality of events occurred (e.g., date, time of day). The failure data may be based on failure events for different physical instances of the same equipment model. For example, an organization may have multiple hydraulic pumps of the same model, and the equipment maintenance system 300 may collect and aggregate all of the data on the failure events for those multiple hydraulic pumps to form the failure data for that specific hydraulic pump model.

In some example embodiments, the failure curve model comprises a parametric model. However, other types of failure curve models are also within the scope of the present disclosure. In some example embodiments, the training of the failure curve model comprises determining a shape parameter and a scale parameter for the failure curve model based on a fitting of the failure event data to a continuous probability distribution, and then storing the shape parameter and the scale parameter in a database in association with the selected failure mode of the selected equipment model. The stored shape parameter and the stored scale parameter may subsequently be accessed for use in generating analytical data for the selected failure mode of the selected equipment model. In some example embodiments, the continuous probability distribution comprises a Weibull distribution. However, other types of continuous probability distributions are also within the scope of the present disclosure.

At operation 1730, the equipment maintenance system 300 generates analytical data for the selected failure mode of the selected equipment model using the trained failure curve model. In some example embodiments, the analytical data indicates at least a portion of the lifetime failure data for the selected equipment model corresponding to the selected failure mode. In some example embodiments, the analytical data is generated at the time indicated by the generation schedule data based on the data generation configuration. Examples of the types of analytical data that may be generated for the equipment model include, but are not limited to, the probability of failure (PoF), the remaining useful life (RUL), and the hazard function. The probability of failure is the probability that the equipment model will suffer a failure event at a particular time or at some other particular life or age indicator (e.g., at a particular number of operations). The remaining useful life is an estimate of the number of remaining years (or some other type of life or age metric) that an item, component, or system is estimated to be able to function in accordance with its intended purpose before needing maintenance, repair, or replacement given a particular time or some other particular life or age indicator. The hazard function (also called the force of mortality, instantaneous failure rate, instantaneous death rate, or age-specific failure rate) is a way to model data distribution in survival analysis and may be used to model an equipment model's chance of failure as a function of its age.

At operation 1740, the equipment maintenance system 300 causes a visualization of the generated analytical data to be displayed on the computing device or on another computing device. The visualization may be generated based on one or more visualization parameters, such as a type of analytics function (e.g., PoF, RUL), a particular failure mode, a specific user selected point on the visualization (e.g., a user selected point on a curve of a graph), a threshold level for a probability of failure for the equipment model, or a confidence interval value for the analytical data. In some example embodiments, the visualization of the analytical data comprises a graph indicating corresponding probabilities of failure by the corresponding specific manner or way of failing of the failure mode for the lifetime of the physical instance of the equipment model. However, other types of visualizations are also within the scope of the present disclosure.

It is contemplated that any of the other features described within the present disclosure can be incorporated into the method 1700.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 18:
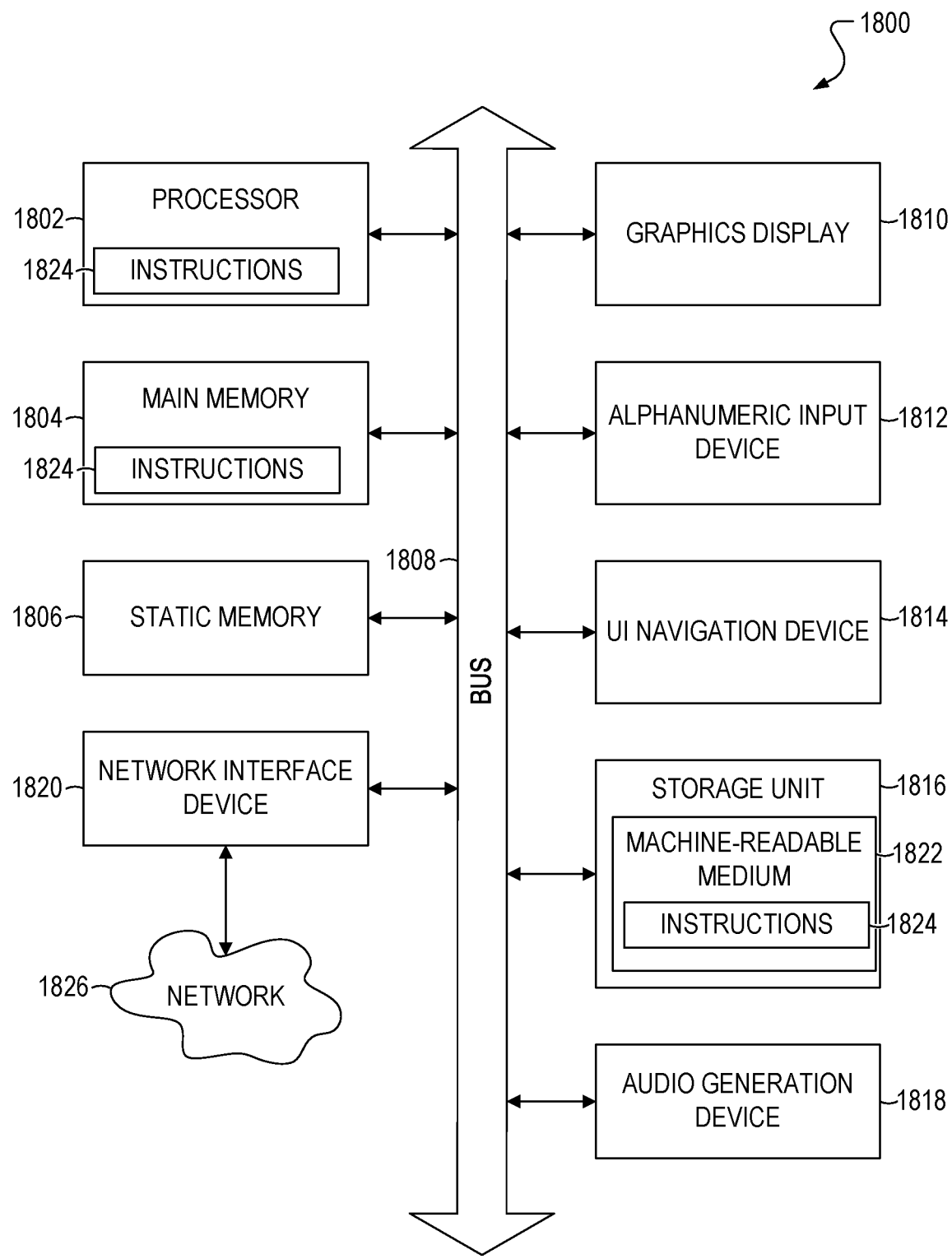
FIG. 18 is a block diagram of an example computer system on which methodologies described herein can be executed, in accordance with some example embodiments.

FIG. 18 is a block diagram of a machine in the example form of a computer system 1800 within which instructions 1824 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804, and a static memory 1806, which communicate with each other via a bus 1808. The computer system 1800 may further include a graphics or video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit (e.g., a disk drive unit) 1816, an audio or signal generation device 1818 (e.g., a speaker), and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various computer systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

1. A computer-implemented method comprising:
   receiving, by at least one hardware processor from a computing device of a user, a model training configuration entered by the user via a user interface displayed on the computing device, the model training configuration comprising an identification of an equipment model selected from a plurality of different equipment models, an identification of a failure mode selected from a plurality of different failure modes of the selected equipment model, and training schedule data, the plurality of different failure modes corresponding to different specific ways in which the selected equipment model is capable of failing, and the training schedule data indicating a time at which to train a failure curve model for the selected failure mode of the selected equipment model;
   training, by the at least one hardware processor, the failure curve model based on the model training configuration at the time indicated by the training schedule data using failure event data for the selected failure mode of the selected equipment model, the failure curve model being configured to estimate lifetime failure data for the selected failure mode of the selected equipment model, the lifetime failure data indicating a probability of the selected equipment model failing in the specific way of the selected failure mode at any specific point in time during a lifetime of a physical instance of the equipment model, the failure event data identifying events in which one or more physical instances of the selected equipment model suffered a functional failure in the specific way of the selected failure mode and comprising time data indicating a corresponding time at which each of the plurality of events occurred; and
   generating, by the at least one hardware processor, analytical data for the selected failure mode of the selected equipment model using the trained failure curve model, the analytical data indicating at least a portion of the lifetime failure data for the selected equipment model corresponding to the selected failure mode.

2. The computer-implemented method of example 1, further comprising causing, by the at least one hardware processor, a visualization of the generated analytical data to be displayed on the computing device or on another computing device.

3. The computer-implemented method of example 1 or example 2, wherein the failure curve model comprises a parametric model.

4. The computer-implemented method of any one of examples 1 to 3, wherein the training of the failure curve model comprises:
   determining a shape parameter and a scale parameter for the failure curve model based on a fitting of the failure event data to a continuous probability distribution; and
   storing the shape parameter and the scale parameter in a database in association with the selected failure mode of the selected equipment model,
   wherein the generating of the analytical data for the selected failure mode of the selected equipment model using the trained failure curve model comprises accessing the shape parameter and the scale parameter stored in the database and generating the analytical data using the accessed shape parameter and scale parameter.

5. The computer-implemented method of any one of examples 1 to 4, wherein the continuous probability distribution comprises a Weibull distribution.

6. The computer-implemented method of any one of examples 1 to 5, wherein the training schedule data indicates a frequency with which to train the failure curve model for the selected failure mode of the selected equipment model.

7. The computer-implemented method of any one of examples 1 to 6, further comprising:
receiving, by the at least one hardware processor from the computing device of the user, a data generation configuration entered by the user via the user interface displayed on the computing device, the data generation configuration comprising generation schedule data indicating a time at which to generate analytical data using the trained failure curve model, wherein the analytical data is generated at the time indicated by the generation schedule data based on the data generation configuration.

8. The computer-implemented method of any one of examples 1 to 7, wherein the generation schedule data indicates a frequency with which to generate the analytical data using the trained failure curve model.

9. A system comprising:
at least one processor; and
a non-transitory computer-readable medium storing executable instructions that, when executed, cause the at least one processor to perform the method of any one of examples 1 to 8.

10. A non-transitory machine-readable storage medium, tangibly embodying a set of instructions that, when executed by at least one processor, causes the at least one processor to perform the method of any one of examples 1 to 8.

11. A machine-readable medium carrying a set of instructions that, when executed by at least one processor, causes the at least one processor to carry out the method of any one of examples 1 to 8.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
receiving, from a computing device of a user, a model training configuration entered by the user via a user interface displayed on the computing device, the model training configuration comprising an identification of an equipment model, an identification of a failure mode of the equipment model, and training schedule data indicating a time at which to train a failure curve model for the failure mode of the equipment model, the failure mode corresponding to a specific way in which the equipment model is capable of failing; and
at the time indicated by the training schedule data, training the failure curve model based on the model training configuration using failure event data for the failure mode of the equipment model, the failure curve model being configured to estimate lifetime failure data for the failure mode of the equipment model, the lifetime failure data indicating a probability of the equipment model failing in the specific way of the failure mode at any specific point in time during a lifetime of a physical instance of the equipment model, the failure event data identifying events in which one or more physical instances of the equipment model suffered a functional failure in the specific way of the failure mode and comprising time data indicating a corresponding time at which each of the plurality of events occurred.

2. The computer-implemented method of claim 1, wherein the failure mode corresponds to a specific subcomponent of the equipment model.

3. The computer-implemented method of claim 1, further comprising generating analytical data for the failure mode using the trained failure curve model, the analytical data indicating at least a portion of the lifetime failure data for the equipment model corresponding to the failure mode.

4. The computer-implemented method of claim 3, wherein the generated analytical data comprises probability of failure data or remaining useful life data.

5. The computer-implemented method of claim 3, further comprising causing a visualization of the generated analytical data to be displayed on a computing device, wherein the visualization of the generated analytical data comprises a graph indicating corresponding probabilities of failure by the specific way of the failure mode for the lifetime of the physical instance of the equipment model.

6. The computer-implemented method of claim 3, further comprising causing a visualization of the generated analytical data to be displayed on a computing device, wherein the visualization is generated based on a specific user-selected point on a curve of a graph.

7. The computer-implemented method of claim 1, wherein the training schedule data indicates a frequency at which to train the failure curve model for the failure mode of the equipment model.

8. A system comprising:
at least one hardware processor; and
a non-transitory computer-readable medium storing executable instructions that, when executed, cause the at least one processor to perform operations comprising:
receiving, from a computing device of a user, a model training configuration entered by the user via a user interface displayed on the computing device, the model training configuration comprising an identification of an equipment model, an identification of a failure mode of the equipment model, and training schedule data indicating a time at which to train a failure curve model for the failure mode of the equipment model, the failure mode corresponding to a specific way in which the equipment model is capable of failing; and
at the time indicated by the training schedule data, training the failure curve model based on the model training configuration using failure event data for the failure mode of the equipment model, the failure curve model being configured to estimate lifetime failure data for the failure mode of the equipment model, the lifetime failure data indicating a probability of the equipment model failing in the specific way of the failure mode at any specific point in time during a lifetime of a physical instance of the equipment model, the failure event data identifying events in which one or more physical instances of the equipment model suffered a functional failure in the specific way of the failure mode and comprising time data indicating a corresponding time at which each of the plurality of events occurred.

9. The system of claim 8, wherein the failure mode corresponds to a specific subcomponent of the equipment model.

10. The system of claim 8, wherein the operations further comprises generating analytical data for the failure mode using the trained failure curve model, the analytical data indicating at least a portion of the lifetime failure data for the equipment model corresponding to the failure mode.

11. The system method of claim 10, wherein the generated analytical data comprises probability of failure data or remaining useful life data.

12. The system of claim 10, wherein the operations further comprises causing a visualization of the generated analytical data to be displayed on a computing device, wherein the visualization of the generated analytical data comprises a graph indicating corresponding probabilities of failure by the specific way of the failure mode for the lifetime of the physical instance of the equipment model.

13. The system of claim 10, wherein the operations further comprises causing a visualization of the generated analytical data to be displayed on a computing device, wherein the visualization is generated based on a specific user-selected point on a curve of a graph.

14. The system of claim 8, wherein the training schedule data indicates a frequency at which to train the failure curve model for the failure mode of the equipment model.

15. A non-transitory machine-readable storage medium, tangibly embodying a set of instructions that, when executed by at least one hardware processor, causes the at least one processor to perform operations comprising:

receiving, from a computing device of a user, a model training configuration entered by the user via a user interface displayed on the computing device, the model training configuration comprising an identification of an equipment model, an identification of a failure mode of the equipment model, and training schedule data indicating a time at which to train a failure curve model for the failure mode of the equipment model, the failure mode corresponding to a specific way in which the equipment model is capable of failing; and at the time indicated by the training schedule data, training the failure curve model based on the model training configuration using failure event data for the failure mode of the equipment model, the failure curve model being configured to estimate lifetime failure data for the failure mode of the equipment model, the lifetime failure data indicating a probability of the equipment model failing in the specific way of the failure mode at any specific point in time during a lifetime of a physical instance of the equipment model, the failure event data identifying events in which one or more physical instances of the equipment model suffered a functional failure in the specific way of the failure mode and comprising time data indicating a corresponding time at which each of the plurality of events occurred.

16. The non-transitory machine-readable storage medium of claim 15, wherein the failure mode corresponds to a specific subcomponent of the equipment model.

17. The non-transitory machine-readable storage medium of claim 15, wherein the operations further comprise generating analytical data for the failure mode using the trained failure curve model, the analytical data indicating at least a portion of the lifetime failure data for the equipment model corresponding to the failure mode.

18. The non-transitory machine-readable storage medium of claim 17, wherein the generated analytical data comprises probability of failure data or remaining useful life data.

19. The non-transitory machine-readable storage medium of claim 17, wherein the operations further comprise causing a visualization of the generated analytical data to be displayed on a computing device, wherein the visualization of the generated analytical data comprises a graph indicating corresponding probabilities of failure by the specific way of the failure mode for the lifetime of the physical instance of the equipment model.

20. The non-transitory machine-readable storage medium of claim 17, wherein the operations further comprise causing a visualization of the generated analytical data to be displayed on a computing device, wherein the visualization is generated based on a specific user-selected point on a curve of a graph.

* * * * *